US008703873B2

(12) United States Patent  
Sauer

(10) Patent No.: US 8,703,873 B2  
(45) Date of Patent: Apr. 22, 2014

(54) MULTIPLE FUNCTION GRAFT POLYMER

(75) Inventor: Richard P. Sauer, North Plainfield, NJ (US)

(73) Assignee: Castrol Limited, Wiltshire (GB)

( * ) Notice: Subject to any disclaimer, the term of this patent is extended or adjusted under 35 U.S.C. 154(b) by 270 days.

(21) Appl. No.: 13/074,110

(22) Filed: Mar. 29, 2011

(65) Prior Publication Data

US 2011/0245119 A1 Oct. 6, 2011

Related U.S. Application Data

(60) Provisional application No. 61/320,019, filed on Apr. 1, 2010.

(51) Int. Cl.
*C08F 255/00* (2006.01)
*C08F 271/02* (2006.01)
*C10M 159/18* (2006.01)

(52) U.S. Cl.
USPC ........... 525/244; 525/245; 525/281; 508/100; 508/110; 508/230; 508/281

(58) Field of Classification Search
USPC .......... 508/283, 100, 110, 230; 525/281, 244, 525/245
See application file for complete search history.

(56) References Cited

U.S. PATENT DOCUMENTS

| 3,873,459 A | 3/1975 | Pawlak |
| 3,940,339 A | 2/1976 | Clarke, Jr. et al. |
| 4,089,794 A | 5/1978 | Engel |
| 4,092,255 A | 5/1978 | Chapelet et al. |
| 4,137,185 A | 1/1979 | Gardiner et al. |
| 4,146,489 A | 3/1979 | Stambaugh et al. |
| 4,160,739 A | 7/1979 | Stambaugh et al. |
| 4,234,435 A | 11/1980 | Meinhardt et al. |
| 4,320,019 A | 3/1982 | Hayashi |
| 4,505,834 A | 3/1985 | Papay et al. |
| 4,517,104 A | 5/1985 | Bloch et al. |
| 4,632,769 A | 12/1986 | Gutierrez et al. |
| 4,640,788 A | 2/1987 | Kapuscinski et al. |
| 4,693,838 A | 9/1987 | Varma et al. |
| 4,780,230 A | 10/1988 | Liu et al. |
| 4,810,754 A | 3/1989 | McCrary |
| 4,812,261 A | 3/1989 | Liu et al. |
| 4,863,623 A | 9/1989 | Nalesnik |
| 4,877,834 A | 10/1989 | Liu et al. |
| 4,904,401 A | 2/1990 | Ripple et al. |
| 4,904,404 A | 2/1990 | Liu et al. |
| 4,969,912 A | 11/1990 | Kelman et al. |
| 5,149,895 A | 9/1992 | Coolbaugh et al. |
| 5,167,845 A | 12/1992 | DeRosa et al. |
| 5,167,848 A | 12/1992 | Chung et al. |
| 5,219,480 A | 6/1993 | Gutierrez et al. |
| 5,275,747 A | 1/1994 | Gutierrez et al. |
| 5,294,354 A | 3/1994 | Parke et al. |
| 5,298,565 A | 3/1994 | Lange et al. |
| 5,328,624 A | 7/1994 | Chung |
| 5,346,635 A | 9/1994 | Khorramian et al. |
| 5,424,357 A | 6/1995 | Larson |
| 5,424,367 A | 6/1995 | Auda et al. |
| 5,427,702 A | 6/1995 | Chung et al. |
| 5,439,605 A | 8/1995 | Khorramian et al. |
| 5,523,008 A | 6/1996 | Boden et al. |
| 5,527,624 A | 6/1996 | Higgins et al. |
| 5,563,118 A | 10/1996 | Mishra et al. |
| 5,614,480 A | 3/1997 | Salomon et al. |
| 5,633,415 A | 5/1997 | Brandes et al. |
| 5,637,783 A | 6/1997 | Brandes et al. |
| 5,652,201 A | 7/1997 | Papay et al. |
| 5,663,126 A | 9/1997 | Boden et al. |
| 5,759,967 A | 6/1998 | Song et al. |
| 5,773,524 A | 6/1998 | Coolbaugh et al. |
| 5,780,540 A | 7/1998 | Brandes et al. |
| 5,814,586 A | 9/1998 | Boden et al. |
| 5,874,389 A | 2/1999 | Boden et al. |
| 6,034,038 A | 3/2000 | Lockwood et al. |
| 6,034,184 A | 3/2000 | Coolbaugh et al. |
| 6,054,539 A | 4/2000 | Coolbaugh et al. |
| 6,100,224 A | 8/2000 | Peiffer et al. |
| 6,103,676 A | 8/2000 | Coolbaugh et al. |
| 6,107,257 A | 8/2000 | Valcho et al. |
| 6,107,258 A | 8/2000 | Esche, Jr. et al. |
| 6,162,768 A | 12/2000 | Coolbaugh et al. |
| 6,187,721 B1 | 2/2001 | Goldblatt et al. |
| 6,215,033 B1 | 4/2001 | Coolbaugh et al. |
| 6,228,817 B1 | 5/2001 | Coolbaugh et al. |
| 6,248,702 B1 | 6/2001 | Coolbaugh et al. |

(Continued)

FOREIGN PATENT DOCUMENTS

| CN | 1137283 A | 12/1995 |
| DE | 144 071 | 9/1980 |

(Continued)

OTHER PUBLICATIONS

Aldrich Handbook of Fine Chemicals 1996-1997, p. 986 Cat. No. 14607-2.

Citovicky, P., et al., The copolymerization of styrene and maleic anhydride initiated by peroxides of isotactic polypropylene, Eur. Polym. J. (1996) vol. 32, No. 2, 153-158.

Moad, G., The synthesis of polyolefin graft copolymers by reactive extrusion, Prog. Polym. Sci. 24 (1999) 81-142.

(Continued)

*Primary Examiner* — Ellen M McAvoy

*Assistant Examiner* — Vishal Vasisth

(74) *Attorney, Agent, or Firm* — McAndrews, Held & Malloy, Ltd.

(57) ABSTRACT

The composition and preparation of multifunctional graft polymers useful as dispersants are described. The dispersants described are suitable for controlling sludge and varnish as well as soot, friction and wear. The product is useful as a lubricant additive.

20 Claims, No Drawings

(56) References Cited

U.S. PATENT DOCUMENTS

| | | |
|---|---|---|
| 6,300,289 B1 | 10/2001 | Boden et al. |
| 6,319,881 B1 | 11/2001 | Coolbaugh et al. |
| 6,410,652 B1 | 6/2002 | Goldblatt et al. |
| 6,472,353 B1 | 10/2002 | Smoggie et al. |
| 6,686,321 B2 | 2/2004 | Boden et al. |
| 6,715,473 B2 | 4/2004 | Ritchie et al. |
| 6,750,183 B2 | 6/2004 | Gutierrez et al. |
| 6,759,375 B2 | 7/2004 | Curtis et al. |
| 6,767,871 B2 | 7/2004 | Devlin et al. |
| 6,939,420 B2 | 9/2005 | Pollack |
| 7,144,951 B2 | 12/2006 | Duyck et al. |
| 7,253,231 B2 | 8/2007 | Devlin et al. |
| 7,371,713 B2 | 5/2008 | Goldblatt et al. |
| 7,514,393 B2 | 4/2009 | Goldblatt |
| 7,981,847 B2 | 7/2011 | Goldblatt et al. |
| 8,263,537 B2 | 9/2012 | Goldblatt |
| 2002/0042349 A1 | 4/2002 | Boden et al. |
| 2004/0043909 A1 | 3/2004 | Goldblatt et al. |
| 2004/0259742 A1 | 12/2004 | Mishra et al. |
| 2005/0192407 A1 | 9/2005 | Gauthy |
| 2005/0209113 A1 | 9/2005 | Goldblatt |
| 2006/0003905 A1 | 1/2006 | Devlin et al. |
| 2006/0025316 A1 | 2/2006 | Covitch et al. |
| 2006/0205611 A1 | 9/2006 | Sauer |
| 2007/0149414 A1 | 6/2007 | Ruhe et al. |
| 2008/0293600 A1 | 11/2008 | Goldblatt et al. |

FOREIGN PATENT DOCUMENTS

| | | |
|---|---|---|
| DE | 301 520 A7 | 2/1993 |
| DE | 19607641 A1 | 9/1997 |
| EP | 0000648 | 2/1979 |
| EP | 0336716 | 10/1989 |
| EP | 0352070 | 1/1990 |
| EP | 0352072 | 1/1990 |
| EP | 0438848 | 7/1991 |
| EP | 0837122 | 4/1998 |
| EP | 0927754 | 7/1999 |
| EP | 0980891 | 2/2000 |
| EP | 1533293 | 5/2005 |
| GB | 1390851 | 4/1975 |
| GB | 1531945 | 11/1978 |
| GB | 2097800 | 11/1982 |
| IN | 738/MMNP/2004 | 4/2005 |
| JP | 3031394 A | 2/1991 |
| JP | H10508051 | 8/1998 |
| JP | 2001-524580 A | 12/2001 |
| JP | 2002-146376 A | 5/2002 |
| JP | 2005-42116 A | 2/2005 |
| JP | 2008-1864 A | 1/2008 |
| SG | 112056 | 5/2005 |
| WO | WO 95/16744 | 6/1995 |
| WO | WO 95/18199 | 6/1995 |
| WO | WO 96/12746 | 5/1996 |
| WO | WO 97/47709 | 12/1997 |
| WO | WO 98/17696 | 4/1998 |
| WO | WO 99/27041 | 6/1999 |
| WO | WO 00/37449 | 6/2000 |
| WO | WO 01/19882 | 3/2001 |
| WO | WO 03020853 | 3/2003 |
| WO | WO 03/099890 | 12/2003 |
| WO | WO 2004/106475 | 12/2004 |
| WO | WO 2006084698 | 8/2006 |
| WO | WO 2006/099250 | 9/2006 |
| WO | WO 2006/116663 | 11/2006 |
| WO | WO 2006133846 | 12/2006 |

OTHER PUBLICATIONS

Zu, J., et al., The Preparation of Sodium Sulfonatepolyethylene Grafted Membranes, Journal of Radiation Research and Radiation Processing, vol. 1 18(3), 158-169 (2000) with English abstract.

Li, Y., et al., Study on styrene-assisted melt free-radical grafting of maleic anhydride onto polypropylene, Polymer 42 (2001) 3419-3425.

Deng, J. et al., Grafting copolymerization of styrene and maleic anhydride binary monomer systems induced by UV irradiation, Eur. Polym. J. 41 (2005) 2685-2692.

Australian Patent Office Search Report Application No. SG 200406722-9 Feb. 24, 2006.

European Search Report corresponding to European Patent Application Serial No. 04257231-.3-2103, dated Mar. 28, 2006.

European Search Report corresponding to European Patent Application Serial No. 03734186.4-1214, dated Aug. 7, 2008, 5 pages.

European Search Report corresponding to European Patent Application Serial No. 08252046.1-2104, dated Feb. 20, 2009.

Russian Patent Office, Official Action issued on May 21, 2010 in Russia Application No. 2007144073/04.

International Search Report and Written Opinion corresponding to PCT Patent Application No. PCT/US2011/030251.

International Search Report and Written Opinion corresponding to PCT Patent Application No. PCT/US2010/056879.

International Search Report and Written Opinion corresponding to PCT Patent Application NO. PCT/US2011/030914.

MULTIPLE FUNCTION GRAFT POLYMER

This application claims the benefit of priority from U.S. Provisional Patent Application No. 61/320,019, filed Apr. 1, 2010, the entirety of which is expressly incorporated herein by reference.

FIELD OF THE INVENTION

The present invention relates to a novel multiple function graft polymer with a polymer backbone that has a molecular weight of from about 10,000 to about 500,000. The polymer backbone is grafted with monomers associated with sludge and varnish control, with monomers associated with soot control and thereby viscosity control associated with soot control, and with monomers associated with anti-wear properties, to thereby provide a graft polymer exhibiting multiple performance functions. The present invention also relates to a method for manufacturing such novel multiple-function graft polymer, and to a lubricating oil composition containing such novel multiple-function polymer.

BACKGROUND OF THE INVENTION

Lubricating oil compositions used to lubricate internal combustion engines contain a base oil of lubricating viscosity, or a mixture of such oils, and additives used to improve the performance characteristics of the oil. For example, additives are used, to improve detergency and dispersancy, to reduce engine wear, to provide stability against heat and oxidation, to reduce oil consumption, to inhibit corrosion, to act as a dispersant, and to reduce friction loss, among other attributes. However, each such additive is a separate component of the formulated lubricating oil and adds cost. Some additives provide multiple benefits, such as a dispersant/viscosity modifier. Other additives, while improving one characteristic of the lubricating oil, have an adverse effect on other characteristics. Thus, to provide a lubricating oil having optimal overall performance, it is necessary to characterize and understand all the effects of the various additives available, and carefully balance the additive content of the lubricant. Moreover, each of the additives is a separate component of the formulated lubricating oil and adds cost. Thus, it would be beneficial to have a single multi-functional additive that controls more than one performance characteristic of the lubricating oil without having an adverse effect on other properties of the lubricating oil.

For example, U.S. Pat. No. 4,234,435, discloses carboxylic acid acylating agents derived from polyalkenes and a dibasic carboxylic reactant such as maleic or fumaric acid or certain derivatives thereof. The acylating agents can be reacted with a further reactant such as polyethylene polyamines and polyols, to produce derivatives useful as lubricant additives.

U.S. Pat. No. 5,614,480, discloses lubricating compositions and concentrates which include carboxylic derivatives produced by reacting certain amines with a substituted succinic acylating agent containing at least about 50 carbon atoms in the substituent.

U.S. Pat. No. 6,107,258, discloses functionalized olefin copolymers that provide dispersancy properties, comprising acylated olefin copolymers containing a reactive carboxylic functionality reacted with a coupling compound which contains more than one amine, thiol and/or hydroxyl functionality which is also reacted with a performance enhancing compound which contains only one functional group capable of reacting with the carboxylic functionality of the acylated olefin copolymer.

Goldblatt et al., U.S. Pat. No. 6,410,652, issued Jun. 25, 2002, discloses a graft copolymer which is useful as a dispersant viscosity index improver and a method for making the graft copolymer. The disclosed method comprises the steps of (a) providing a graftable polymer or copolymer having a weight average molecule weight of from about 20,000 to about 500,000, an ethylenically unsaturated sulfur-, nitrogen- and/or oxygen-containing graftable monomer, and an amount of an initiator that is sufficient to graft such monomer and graftable copolymer or polymer; (b) introducing the aforesaid graftable copolymer or polymer into a melt-blending apparatus; (c) introducing the aforesaid graftable monomer into the melt-blending apparatus, (d) introducing the aforesaid initiator into the melt-blending apparatus, wherein at least one of the aforesaid graftable copolymer or polymer, graftable monomer and initiator is introduced into the melt-blending apparatus in the presence of at least either a polar or non-polar solvent; and (e) reacting the aforesaid graftable copolymer or polymer, monomer and initiator in the melt-blending apparatus, thereby forming the aforesaid graft copolymer as the product. The aforesaid Goldblatt et al. '652 also discloses a lubricating oil composition comprising a base oil and an aforesaid graft copolymer.

Goldblatt et al., U.S. Pat. No. 7,371,713, issued on May 13, 2008, discloses graftable monomers that are formed as the product of the reaction between an amine and an acylating agent. The reaction product is a graftable ethylenically unsaturated, aliphatic or aromatic monomer having nitrogen or oxygen atoms. This graftable monomer is then grafted onto a polyolefin backbone having a weight average molecular weight of from about 10,000 to about 750,000 to form a graft copolymer that has dispersant viscosity index improving properties. More particularly, the aforesaid polyolefin backbone is dissolved in a solvent, and the graftable monomer and an initiator are added to the resulting solution. In the alternative, a melt-blending procedure can be employed to graft the graftable monomer onto the aforesaid polyolefin. The aforesaid Goldblatt et al., '713 also discloses a lubricating oil composition comprising a hydrocarbon base oil and the aforesaid graft copolymer.

Goldblatt et al., U.S. patent application Ser. No. 11/912,847, published on Nov. 27, 2008 as Publication No. 2008/0293600A1, discloses a multifunctional grafted polymer containing two groups of monomers grafted to a polyolefin or polyester backbone having a weight average molecular weight from about 10,000 to about 1,000,000, one group of monomers to impart dispersancy, viscosity index improvement and sludge and varnish control as well as another group of monomers to impart soot handling. Generally, one such group of monomers comprises ethylenically unsaturated, aliphatic or aromatic monomers having 2 to about 50 carbon atoms containing oxygen or nitrogen, or both oxygen and nitrogen and imparts dispersancy, viscosity index improvement and sludge and varnish control. Another such group of monomers, the acylating agent provides acyl groups for reaction, and reacts with amines to form substituents that are suitable for imparting soot handling performance. In general, such amines are comprised of primary and secondary amines that can undergo a condensation reaction with an appropriate acylating agent.

Goldblatt et al. '847 also discloses a lubricating oil comprising a hydrocarbon base oil and a multifunctional grafted polymer described above. The multifunctional grafted polyolefin or polyester functions as an additive to control viscosity, sludge, varnish, and soot. Such lubricating oils utilize both (a) the superior dispersancy and (b) the soot control properties of the disclosed multi-functional grafted polymers and thereby require lower amounts of the other additives or fewer additives.

Goldblatt et al. '847 also discloses an effective method of making the aforesaid multi-functional graft polymer in which the grafting sequence is important in order to generate the multi-functional graft polymer described herein. In order to achieve good performance with respect to both soot handling and sludge and varnish control, it is important to first graft a graftable acylating agent onto the polymer backbone to thereby form a polymer containing acyl groups. Next, the monomer or monomer grouping associated with sludge and varnish handling is introduced and reacted. Finally, the amine or amines capable of undergoing a reaction with the acyl group, is introduced and reacted with the acylated polymer thereby imparting soot handling performance to the graft polymer.

To provide improved wear performance, conventional lubricants are formulated with an anti-wear additive. Metal hydrocarbyl dithiophosphates, particularly zinc dialkyldithiophosphates (ZDDP), are the primary anti-wear additives, used in lubricating oils for internal combustion engines. ZDDP provides excellent wear protection at a comparatively low cost and also functions as an antioxidant. However, there is some evidence that phosphorus in lubricants can shorten the effective life of automotive emission catalysts. Accordingly, industry has limited the amount of phosphorus that lubricants can contain. The previous industry category (ILSAC GF-3) mandated a lubricant phosphorus limit of 1000 ppm. The current category of service fill oils in the United States (ILSAC GF-4) mandates even more stringent limits, a maximum phosphorus content of no more than 800 ppm. Future standards may require even more stringent limits, such as a maximum phosphorus content of no more than 500 ppm.

To meet these emerging requirements, it would therefore be advantageous to provide lubricating oils, particularly lubricating oils formulated with base oils having relatively high viscosity indices and low volatilities for improved fuel economy, that also provide excellent low temperature valve train wear performance and anti-oxidant properties with reduced amounts of phosphorus-containing anti-wear additives.

Khorramian, U.S. Pat. Nos. 5,346,635 and 5,439,605 describe lubricating oils completely free of phosphorus-containing anti-wear additives containing a complex blend of ashless friction reducers, ashless anti-wear/extreme pressure additives, antioxidants, metal detergents and polymeric viscosity modifiers and flow improvers, which compositions purportedly provide acceptable properties. These compositions may also contain a molybdenum-containing additive as a friction modifier.

Boden et al., U.S. Pat. No. 5,523,008, which is incorporated herein by reference in its entirety, describes polyolefins containing nitrogen-containing and/or oxygen-containing monomers for use as dispersant viscosity index improvers. The grafted polyolefin contains at least about 13 moles of N-vinylimidazole (similarly known as 1-vinylimidazole), or other ethylenically-unsaturated nitrogen-containing and/or oxygen-containing monomers, per mole of a grafted polyolefin backbone. Also described is a lubricating oil comprising a lubricant base oil and a grafted polyolefin as described above as well as a method of making a dispersant-viscosity index improver. N-vinylimidazole or other ethylenically unsaturated nitrogen-containing and/or oxygen-containing monomers and a graftable polyolefin are reacted with sufficient initiator to graft at least about 13 moles of the monomer to each mole of the polyolefin.

Sauer, U.S. patent application Ser. No. 11/371,481 published on Sep. 14, 2006 as Publication No. 2006/0205611A1, discloses a multiple function polymer comprising a graft polymer of a polyolefin having a weight average molecular weight of from about 20,000, to about 500,000, a nitrogenous, ethylenically unsaturated, aliphatic or aromatic monomer having from 2 to about 50 carbon atoms, which imparts dispersancy which is associated with sludge and varnish handling, and an organo-metallic compound which is capable of reacting with said polyolefin and which imparts anti-wear properties. The organo-metallic compounds comprise metal carboxylates and metal oxides, and further comprise a metallic member selected from the group consisting of molybdenum, cobalt, titanium, calcium, magnesium, manganese, bismuth, tungsten, and copper. The multiple function grafter polymer contains from about 8 to about 16 moles of the nitrogenous ethylenically unsaturated monomer and about 2 to 5 moles of the organometallic monomer.

Sauer '481 also discloses a process for making the aforesaid multiple function graft polymer. The disclosed process comprises the steps of providing a polyolefin having a weight average molecular weight of from about 20,000 to about 500,000, an initiator, and an aforesaid nitrogenous, ethylenically unsaturated, aliphatic or aromatic monomer having from 2 to about 50 carbon atoms that is capable reacting with the aforesaid polyolefin. The polyolefin is dissolved in a solvent forming a solution, and the nitrogenous ethylenically unsaturated monomer is dispersed in the resulting solution. The initiator is added to the solution at a temperature exceeding the initiation temperature of the initiator so that a dispersant polymer is formed. The resulting solution is maintained at the same temperature, and an aforesaid organo-metallic compound is added to the resulting solution and at the same temperature and is grafted to the graft dispersant polymer, thereby forming the aforesaid multiple function polymer.

Sauer '481 also discloses a lubricating oil composition comprising a lubricant base oil, at least about 0.1 percent by weight of the aforesaid multiple function polymer, and from 0 percent to about 4 percent by weight of other dispersants. Such lubricating oil employs both the superior dispersancy and anti-wear properties of the multiple function grafted polymer, thereby requiring fewer additives.

The inventors of the present invention have now discovered a novel multiple function graft polymer for lubricating oil compositions. The multiple function graft polymer imparts dispersancy and control of viscosity, sludge, varnish and soot, and additionally has anti-wear and anti-friction properties, without having an adverse effect on anti-oxidant properties.

SUMMARY OF THE INVENTION

The present invention is a multiple function polymer comprising a graftable polymer that has a weight average molecular weight of from about 10,000 to about 500,000, a graftable ethylenically unsaturated, aliphatic or aromatic monomer having from 2 to about 50 carbon atoms and containing at least one of nitrogen and oxygen, a second monomer that is the condensation product of an amine and graftable coupling group selected from the group consisting of acylating agents and epoxides, and an organo-metallic compound. The graftable polymer is selected from the group consisting of polyolefins, polyesters, and combinations thereof.

The ethylenically unsaturated, aliphatic or aromatic monomer imparts dispersancy and viscosity, sludge and varnish control. The second monomer that is the condensation product of the graftable coupling agent or group and the amine imparts soot control properties. The organo-metallic compound imparts anti-wear and anti-friction properties.

The amine that undergoes a condensation reaction with the aforesaid graftable coupling group is selected from the group of primary and secondary amines. A suitable coupling agent is selected from the group consisting of acylating agents and epoxides, has at least two component coupling sites, at least one of which is a site of olefinic unsaturation, and reacts with the graftable polymer to afford a coupling group, such as an acyl group, on the backbone of the polymer. The coupling agent is typically an acylating agent selected from the group consisting of monocarboxylic acids, dicarboxylic acids, polycarboxylic acids, the anhydrides of such acids, and the lower alkyl esters of such acids, the halides of such acids, and combinations thereof, or an epoxide.

Organo-metallic compounds suitable for imparting anti-wear properties are those which are capable of reacting with the polymer. The organo-metallic compounds comprise metal carboxylates and metal oxides and more particularly comprise a metallic member selected from the group consisting of molybdenum, cobalt, titanium, calcium, magnesium, manganese, bismuth, tungsten, and copper.

The present invention is also a process which can be performed either in solution or by melt extrusion to make the aforesaid multiple function graft polymer of this invention. The solution phase process comprises the steps of providing an aforesaid graftable polymer, an initiator, an aforesaid ethylenically unsaturated, aliphatic or aromatic graftable monomer, an aforesaid graftable coupling group, an aforesaid amine, and an aforesaid organo-metallic compound. First, the aforesaid graftable polymer is dissolved in a solvent. The subsequent grafting sequence is important in order to generate the multi-functional graft polymer of this invention. To achieve good performance with respect to both soot handling as well as sludge and varnish control, it is important to first graft the aforesaid coupling agent in the presence of an initiator onto the graftable polymer to form a polymer containing coupling groups on the backbone. Next, the aforesaid ethylenically unsaturated graftable monomer is introduced, and the ethylenically unsaturated monomer is grafted to the graftable polymer backbone in the presence of initiator. Then the amine or amines capable of undergoing a reaction with the grafted coupling group are introduced and reacted with the coupling group on the polymer backbone, and finally the organo-metallic compound is introduced and reacts with the polymer backbone.

The melt process comprises the steps of providing an aforesaid graftable polymer, an aforesaid initiator, an aforesaid graftable ethylenically unsaturated, aliphatic or aromatic monomer, an aforesaid graftable coupling agent, an aforesaid amine capable of undergoing reaction with coupling groups formed by reaction of the aforesaid polymer and coupling agent, and an aforesaid organo-metallic compound. First, the aforesaid graftable polymer is fed as a solid to the extruder, blender or mixer and maintained under the desired reaction conditions. The aforesaid graftable ethylenically unsaturated monomer, graftable coupling agent, and initiator are introduced with, separately or after the graftable polymer. After the reaction of the graftable polymer with the graftable monomer and the graftable coupling agent, the aforesaid amine capable of reacting with the coupling groups either is fed to the extruder, blender or mixer where it reacts with the coupling groups, or is introduced to a solution of the graft polymer that had been produced in the extruder, blender or mixer and reacts with the graft polymer in solution. Similarly after the reaction between the amine and the coupling groups in the extruder or in solution, the organo-metallic compound is fed to the extruder or into the solution, respectively, and reacts with the polymer backbone.

The present invention is also a lubricating oil composition comprising a lubricant base oil containing at least about 0.05 weight percent of the multiple function, multigraft polymer of this invention, and from 0 to about 4 weight percent of other dispersants.

DETAILED DESCRIPTION OF THE INVENTION

One embodiment of the invention relates to a multifunctional multiple-graft polymer comprising a graft polymer of:
  a. a polymer having graftable sites;
  b. a graftable coupling agent having at least two component coupling sites, at least of which is a site of olefinic unsaturation capable of forming coupling groups on the polymer, and selected from the group consisting of acylating agents and epoxides;
  c. a graftable ethylenically unsaturated, aliphatic or aromatic monomer having from 2 to about 50 carbon atoms and containing at least one of nitrogen and oxygen;
  d. an amine capable of reacting with the coupling groups on the polymer backbone that is formed by reaction between the aforesaid graftable coupling agent and graftable polymer; and
  e. an organo-metallic compound capable of reacting with the polymer and comprising a metallic member selected from the group consisting of molybdenum cobalt, titanium, calcium, magnesium, manganese, bismuth, tungsten and copper.

In the multifunctional multiple-graft monomer graft polymer of the present invention, the aforesaid graftable polymer may be selected from the group consisting of polyolefins, polyesters, and combinations thereof.

Another embodiment of the present invention relates to a lubricating oil comprising:
  a. a lubricant base oil;
  b. a multifunctional multiple-graft monomer graft polymer according to this specification; and, optionally,
  c. other lubricating oil additives.

Another embodiment of the present invention relates to a method of improving soot handling and sludge and varnish control and the anti-wear properties of a lubricating oil which comprises incorporating into said oil an effective amount of the multiple function dispersant polymer of the present invention.

The novel multifunctional graft polymer according to the present invention is made by reaction of a graftable polyolefin or polyester, (either neat, dissolved in a suitable solvent, or neat in a melt state), with a graftable coupling agent in the presence of an initiator. The graft polymer containing the coupling group thus formed is then reacted in the presence of an initiator with one or more aforesaid graftable ethylenically unsaturated monomers that contain at least one of nitrogen and oxygen and that are capable of imparting sludge and varnish control properties. Next, one or more amines suitable for imparting soot handling performance are reacted with the coupling groups on the polymer backbone. Finally one or more organo-metallic compounds are reacted with the graft polymer backbone to provide the multifunctional multiple-graft polymer of the present invention.

In preparing the multifunctional multiple-graft polymer of the present invention as described above, more than one polyolefin or polyester or mixtures of one or more polyolefins and/or polyesters can be used. More than one aforesaid coupling agent, ethylenically unsaturated monomer capable of imparting sludge and varnish handling properties, initiator, amine, and organo-metallic compound can be used as well.

Another embodiment of the present invention relates to a method of making a multifunctional multiple-graft polymer comprising the steps of
(a) reacting an aforesaid graftable polymer having graftable sites with a coupling agent selected from the group consisting of acylating agents and epoxides and having at least two component coupling sites, at least one of which is a site of olefinic unsaturation, in the presence of an initiator, to form a graft polymer reaction product of the coupling agent and polymer backbone;
(b) reacting the graft polymer reaction product formed in step (a) with an aforesaid ethylenically unsaturated, aliphatic or aromatic monomer having from 2 to about 50 carbon atoms and containing at least one of nitrogen and oxygen, in the presence of an initiator, to form a graft polymer reaction product of the aforesaid ethylenically unsaturated monomer and the polymer backbone having coupling groups available for reaction;
(c) reacting the graft polymer reaction product formed in step (b) with an amine capable of reacting with the grafted coupling groups to form a multiple-graft polymer.
(d) reacting an organo-metallic compound with the product of step (c) to form the aforesaid multifunctional multiple graft polymer of the present invention.

Reaction Materials

The following examples of aforesaid graftable polymers, graftable coupling agents, graftable ethylenically unsaturated monomers, amines capable of undergoing reaction with the grafted coupling groups, initiators and organo-metallic compounds to yield products having dispersancy properties and useful for controlling sludge, varnish, viscosity, soot, and wear are contemplated for use in making the multifunctional multiple-graft polymers of the present invention.

Graftable Polymers

A wide variety of polyolefins, modified polyolefins, polyesters, and modified polyesters (which may or may not have pendant unsaturation) are contemplated as suitable graftable polymers for use in the present invention. The materials contemplated include homopolymers, copolymers, terpolymers and higher, such as, but not limited to, polymers generated from ethylene, propylene, isoprene, butene, butadiene, isobutylene, methyl methacrylate and methyl acrylate, styrene and combinations thereof. Examples of such polyolefins and polyesters include polymers containing one or more monomers, such as polyisobutylene, polymethacrylates, polyacrylates, polyalkylstyrenes, partially hydrogenated polyolefins of butadiene and styrene and polymers of isoprene, as well as copolymers of styrene and isoprene.

The use of mixtures of polyolefins, mixtures of polyesters, and mixtures of polyolefins and polyesters for making the multifunctional graft polymer of the present invention is also contemplated. The use of mixtures of olefins and esters to make mixed olefin-ester polymers is also contemplated. The use of chemical and physical mixtures of polyolefins, mixtures of polyesters, and combinations thereof is also contemplated. The polymers contemplated herein may have molecular weights of from about 10,000, preferably from about 150,000, to about 500,000, preferably to about 200,000. The polymers have polydispersities from about 1 to about 15.

Particular materials contemplated for use herein include ethylene/propylene polyolefins containing from 30 percent to 80 percent ethylene and from 70 percent to 20 percent propylene moieties by number, optionally modified with from 0 percent to 9 percent diene monomers. Exemplary diene monomers are 1,4-butadiene, isoprene, 1,4-hexadiene, dicyclopentadiene, 2,5-norbornadiene, ethylidene-norbornadiene, the dienes recited in column 2 lines 36-44 of U.S. Pat. No. 4,092,255 or combinations of more than one of them. Specific materials which are contemplated for use herein include: Mitsui VISNEX polymers, which are terpolymers of ethylene, propylene, and ethylidene-norbornadiene, CAS No. 25038-36-2, sold by Mitsui Petrochemical Industries, Ltd., Tokyo, Japan; VISTALON ethylene/propylene polyolefins sold by Exxon Chemical Americas, Houston, Tex.; ethylene/propylene polymers CAS No. 9010-79-1, and terpolyolefins (EPDM) Cas No. 25038-36-2 sold under the DUTRAL name by Polimeri Europa, Ferrara, Italy.

Acylating Agent

An acylating agent that is suitable for use as a coupling agent in the present invention has at least two component coupling sites, at least one of which is a site of olefinic unsaturation, in its structure. Usually, the point of olefinic unsaturation, will correspond to —HC=CH— or —HC=CH$_2$. Acylating agents in which the point of olefinic unsaturation is $\alpha$, $\beta$ to a carboxy functional group are particularly useful. Olefinically unsaturated mono-, di-, and polycarboxylic acids, the lower alkyl esters thereof, the halides thereof, and the anhydrides thereof are typical acylating agents that are suitable for use in the present invention. Preferably, the olefinically unsaturated acylating agent employed in the present invention is a mono- or dibasic acid, or a derivative thereof such as an anhydride, lower alkyl ester, halide or mixture of two or more such derivatives. In this context "lower alkyl" means an alkyl group having from one to seven carbon atoms.

A suitable acylating agent may include at least one member selected from the group consisting of monounsaturated $C_4$ to $C_{50}$, preferably $C_4$ to $C_{20}$, more preferably $C_4$ to $C_{10}$, dicarboxylic acids; monounsaturated $C_3$ to $C_{50}$, preferably $C_3$ to $C_{20}$, more preferably $C_3$ to $C_{10}$, monocarboxylic acids; and anhydrides thereof (that is, anhydrides of those dicarboxylic acids or of those monocarboxylic acids), and combinations of any of the foregoing acids and/or anhydrides.

Suitable acylating agents include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, methylcrotonic acid, sorbic acid, 3-hexenoic acid, 10-decenoic acid, 2-pentene-1,3,5-tricarboxylic acid, cinnamic acid, and lower alkyl (for example, $C_1$ to $C_4$ alkyl) acid esters of the foregoing, for example, methyl maleate, ethyl fumarate, and methyl fumarate. Particularly preferred acylating agents are the unsaturated dicarboxylic acids and their derivatives, especially maleic acid, fumaric acid and maleic anhydride.

Epoxide Reagent

An epoxy derivative that is useful as a coupling agent in the present invention has, in general, at least one point of olefinic unsaturation in its structure. Once the epoxide is grafted onto the polymer backbone, it may be reacted, for example, with an amine to form hydroxyl amine. The grafted epoxide may also be reacted with other reagents such as alcohols, mercaptans and carboxylic acids. Suitable epoxides include glycidyl methacrylate, allyl glycidyl ether, 1,2-epoxy-5-hexene and 3,4-epoxy-1-butene.

Graftable Ethylenically Unsaturated Monomers

Ethylenically unsaturated monomers that are useful for imparting sludge and varnish control, are, very broadly, ethylenically unsaturated, aliphatic or aromatic monomers having from 2 to about 50 carbon atoms and containing at least one of nitrogen and oxygen. Combinations of such ethylenically-unsaturated monomers are also contemplated for use as graftable monomers in the present invention.

Specific graftable monomers contemplated for use herein include the following: N-vinylimidazole (also known as 1-vinylimidazole) (VIMA), 1-vinyl-2-pyrrolidinone, C-vinylimidazole, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, maleimides, acylamides, such as N,N-dimethyl acrylamide and N,N-dimethylaminopropyl acrylamide as well as combinations of these materials or other similar materials.

Such graftable ethylenically unsaturated monomer(s) for use in the present invention may contain, in addition to nitrogen and/or oxygen, other elements such as sulfur, phosphorus, or the halogens. Specific graftable monomers of this group contemplated for use include 4-methyl-5-vinyl thiazole and N-allyl diisooctyl phenothiazine. A more complete description of suitable ethylenically unsaturated monomers can be found in column 5, lines 3-43 of U.S. Pat. No. 5,523, 008.

Amines for Reaction with the Coupling Group

Amines suitable for imparting soot handling performance are those primary or secondary amines which are capable of undergoing a condensation reaction with a coupling group formed by reaction between the graftable polymer and an appropriate graftable coupling agent. One or more amines may be used. Amines capable of being acylated are disclosed in column 4, line 60 to column 6, line 14 of U.S. Pat. No. 4,320,019, the disclosure of which in its entirety is incorporated herein by reference; column 10, line 61 to column 13, line 18 of U.S. Pat. No. 5,424,367, the disclosure of which in its entirety is incorporated herein by reference; and in column 13, line 5 to column 17, line 32 of U.S. Pat. No. 5,427,702, the disclosure of which in its entirety is incorporated herein by reference. Among the various amine types that are useful in the practice of this invention are alkyl amines, alkylene amines, amines of molecules containing hetero-atoms or heterocycles, alkylene polyamines, aromatic amines, and polyoxyalkylene polyamines.

Some examples of the alkyl amines, alkylene amines, alkylene polyamines and amines of molecules containing heterocycles, include methyleneamines, ethyleneamines, butyleneamines, propyleneamines, pentyleneamines, hexyleneamines, heptyleneamines, octyleneamines, N,N-dimethyaminopropyl amine, N,N-dioctylethyl amine, other polymethyleneamines, the cyclic and higher homologs of these amines such as the piperazines, the amino-alkyl-substituted piperazines, such as (2-aminopropyl)-piperazine; 1,4-bis-(2-aminoethyl)piperazine, and 2-methyl-1-(2-aminobutyl)piperazine, etc. Suitable polyaminic materials include ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, and N-octyl-N'-methyethylene diamine. Other higher homologs obtained by condensing two or more of the above-mentioned alkyleneamines may also be used as well as heterocycles such as 3-morpholinopropylamine.

Other amine types useful in the practice of this invention include amino-aromatic compounds such as aryl amines, alkyl aryl amines and the N-arylphenylenediamines. Specific aromatic amines include, for example, aniline, 4-morpholine aniline, benzylamine, phenylethyl amine, 3-phenyl-1-propylamine, and the N-phenylphenylenediamines, such as N-phenyl-1,4-phenylenediamine (also referred to as 4-aminodiphenylamine), N-phenyl-1,3-phenylenediamine, N-phenyl-1,2-phenylenediamine, N-naphthyl-phenylenediamine, N-phenylnaphthalenediamine and N'-aminopropyl-N-phenylphenylenediamine. Combinations of the above amines may be also used to react with one or more coupling groups.

Examples of suitable polyoxyalkylene polyamines are those which have the formulae:

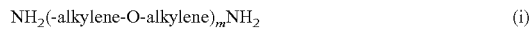

where m has a value of about 3 to 70 and preferably 10 to 35; and

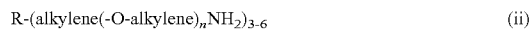

where n has a value of about 1 to 40, with the provision that the sum of all the n's is from about 3 to about 70, and preferably from about 6 to about 35, and R is a polyvalent saturated hydrocarbon radical of up to ten carbon atoms. The alkylene groups in either formula (i) or (ii) may be straight or branched chains containing about 2 to 7, and preferably about 2 to 4 carbon atoms.

The polyoxyalkylene polyamines, such as polyoxyalkylene diamines and polyoxyalkylene triamines, have average molecular weights ranging from about 200 to about 4000 and preferably from about 400 to about 2000. Suitable polyoxyalkylene polyamines include the polyoxyethylene and polyoxypropylene diamines and the polyoxypropylene triamines having average molecular weights ranging from about 200 to 2000.

Other amine types useful in the practice of this invention include amino-aromatic compounds such as:

N-arylphenylenediamines represented by the formula:

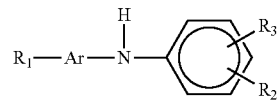

in which Ar is aromatic and $R_1$ is hydrogen or —NH-aryl, —NH-arylalkyl, —NH-alkylaryl, or a branched or straight chain radical having from 4 to 24 carbon atoms wherein the radical can be an alkyl, alkenyl, alkoxyl, arylalkyl, alkylaryl, hydroxyalkyl or aminoalkyl radical, $R_2$ is —$NH_2$, —(NH$(CH_2)_n$—)$_m$—$NH_2$, $CH_2$—$(CH_2)$—$NH_2$, or -aryl-$NH_2$, in which n and m each has a value from 1 to 10, and $R_3$ is hydrogen or an alkyl, alkenyl, alkoxyl, arylalkyl, or alkylaryl radical which may have from 4 to 24 carbon atoms. The N-arylphenylenediamine compounds may also be represented by the formula:

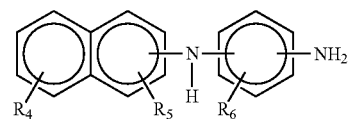

in which $R_4$, $R_5$ and $R_6$ are hydrogen or a linear or branched hydrocarbon radical containing from 1 to 10 carbon atoms wherein the radical may be an alkyl, alkenyl, alkoxyl, alkylaryl, arylalkyl, hydroxyalkyl, or aminoalkyl radical, and $R_4$, $R_5$ and $R_6$ can be the same or different;

Particularly preferred N-arylphenylenediamines are the N-phenylphenylenediamines, for example, N-phenyl-1,4- phenylenediamine (also referred to herein as 4-aminodiphenylamine), N-phenyl-1,3-phenylenediamine, N-phenyl-1,2-phenylenediamine, N-naphthyl-phenylenediamine, N-phenylnaphthalenediamine and N'-aminopropyl-N-phenylphenylenediamine. Most preferably, the amine is 4-aminodiphenylamine (also called N-phenyl-1,4-phenylenediamine).

Other useful amines include the amino-imidazolines such as 2-heptyl-3-(2-aminopropyl) imidazoline, 4-methylimidazoline and 1,3-bis-(2-aminoethyl) imidazoline, and the aminothiazoles such as aminothiazole, aminobenzothiazole, aminobenzothiadiazole and aminoalkylthiazole.

The aminocarbazoles, aminoindoles, amino-indazolinones, aminomercaptotriazole and aminoperimidines are also useful. Structures for these are presented below. The aminocarbazoles are represented by the formula:

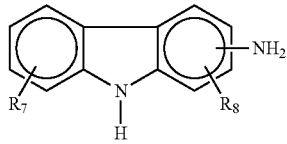

in which $R_7$ and $R_8$ represent hydrogen or an alkyl, alkenyl, or alkoxyl radical having from 1 to 14 carbon atoms, and $R_7$ and $R_8$ can be the same or different;

The aminoindoles are represented by the formula:

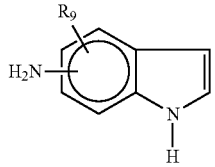

in which $R_9$ represents hydrogen or an alkyl radical having from 1 to 14 carbon atoms, The amino-indazolinones are represented by the formula:

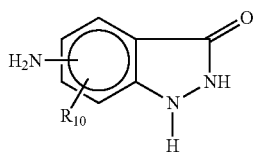

in which $R_{10}$ is hydrogen or an alkyl radical having from 1 to 14 carbon atoms, The aminomercaptotriazole is represented by the formula:

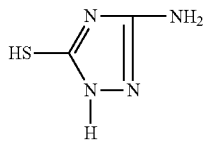

The aminoperimidines are those represented by the formula:

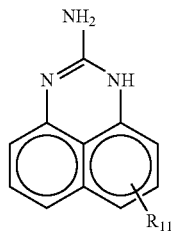

in which $R_{11}$ represents hydrogen or an alkyl or alkoxyl radical having from 1 to 14 carbon atoms.

Other useful amines include: 2-heptyl-3-(2-aminopropyl) imidazoline, 4-methylimidazoline, 1,3-bis-(2-aminoethyl) imidazoline, (2-aminopropyl)-piperazine, 1,4-bis-(2-aminoethyl)piperazine, N,N-dimethyaminopropyl amine, N,N-dioctylethyl amine, N-octyl-N'-methylethylene diamine, and 2-methyl-1-(2-aminobutyl)piperazine, and an aminothiazole from the group consisting of aminothiazole, aminobenzothiazole, aminobenzothiadiazole and aminoalkylthiazole.

It is also contemplated that combinations of the above amines may be used to react with one or more coupling agent groups.

The choice of amine compound will depend, in part, upon the nature of the coupling group. In the case of one preferred acylating agent, maleic anhydride, those amines that will react advantageously with the anhydride functionality are preferred. Primary amines are preferred because of the stability of the imide products formed. Primary amines, structurally described as $RNH_2$, in which the R group may contain performance enhancing functionalities desirable for the final product may be used. Such properties may include, among others, wear protection, friction reduction and protection against oxidation. Incorporation of elements in addition to carbon, hydrogen and nitrogen, such as, but not limited to, the halogens or sulfur or oxygen, or phosphorus, either alone or in combination, is also contemplated.

Free-Radical Initiators

Broadly, any free-radical initiator capable of operating under the conditions of the reactions between the aforesaid graftable polymer and (a) the aforesaid graftable coupling agent and (b) the aforesaid graftable ethylenically unsaturated monomer is suitable for use in the present invention. Representative initiators are disclosed in column 4, lines 45-53 of U.S. Pat. No. 4,146,489, the disclosure of which in its entirety is incorporated herein by reference. Specific "peroxy" initiators contemplated include alkyl, dialkyl, and aryl peroxides, for example: di-t-butyl peroxide (abbreviated herein as "DTBP"), dicumyl peroxide, t-butyl cumyl peroxide, benzoyl peroxide, 2,5-dimethyl-2,5-di(t-butylperoxy)hexane, and 2,5-dimethyl-2,5-di(t-butylperoxy)hexyne-3. Also contemplated are peroxyester and peroxyketal initiators, for example: t-butylperoxy benzoate, t-amylperoxy benzoate, t-butylperoxy acetate, t-butylperoxy benzoate, di-t-butyl diperoxyphthalate, and t-butylperoxy isobutyrate. Also contemplated are hydroperoxides, for example: cumene hydroperoxide, t-butyl hydroperoxide, and hydrogen peroxide. Also contemplated are azo initiators, for example: 2-t-butylazo-2-cyanopropane, 2-t-butylazo-1-cyanocyclohexane, 2,2'-azobis(2,4-dimethylpentane nitrile), 2,2'-azobis(2-methylpropane nitrile), 1,1'-azobis(cyclohexanecarbonitrile), and azoisobutyronitrile (AIBN). Other similar materials are also contemplated such as, but not limited to, diacyl peroxides, ketone peroxides and peroxydicarbonates. It is also contemplated that combinations of more than one initiator, including combinations of different types of initiators, may be employed.

Each initiator has a characteristic minimum reaction initiation temperature above which it will readily initiate a reaction and below which the reaction will proceed slowly or not at all. Consequently, the minimum temperature at which to carry out the grafting reaction is dictated by the selection of the initiator.

Anti-Wear Monomer

In general, any organo-metallic compound, including but not limited to metal carboxylates, such as metal acetylacetonates and metal oxides that can react with the polymer backbone is contemplated for use herein. For example, organo-metallic compounds comprised of a metal oxide reacted with an acid ligand of the Structure A below can react with the backbone of the grafted polymer.

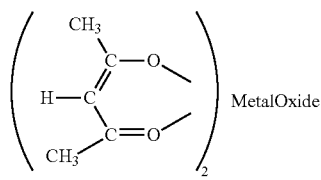

Structure A

Suitable organo-metallic compounds comprise a metallic member selected from the group consisting of molybdenum, cobalt, titanium, calcium, magnesium, manganese, bismuth, tungsten, and copper. In one aspect of the invention, the organo-metallic compound may contain one or more $C_6$ to $C_{40}$ carboxylate moieties which may be linear or branched. In a preferred embodiment the organo-metallic compound may be molybdenum carboxylates containing one of more linear or branched carboxylate moieties having from six to forty carbon atoms.

Preferably, the organo-metallic compounds are molybdenum compounds. Organo-metallic compounds suitable for use in the present invention also include molybdenum boro neodecanoate (sometimes also referred to as molybdenum borate neodecanoate), molybdenum 2-ethylhexanoate 4-nonyloxbenzoate, molybdenum isosterate (4-nonyloxbenzoate) molybdenum dodecylbenzenesulfonate molybdenum $C_{18}$ branched-linear carboxylate, molybdenum $C_{36}$ linear carboxylate, molybdenum $C_{36}$+-$C_{18}$ branched linear carboxylate, molybdenum $C_{36}$ branched-linear carboxylate, molybdenum $C_{36}$/$C_{36}$+ linear carboxylate, molybdenum $C_{36}$+ branched alkyl carboxylate/t-butyl benzoate, molybdenum $C_{18}$ branched alkyl carboxylate/t-butyl benzoate molybdenum oleate, molybdenum $C_{18}$ linear alkyl carboxylates/t-butyl benzoate, bismuth octoate, bismuth neodecanoate, sodium salt of tungsten/2-ethylhexanoate, which may be obtained from Shepherd Chemical Company.

In one preferred embodiment molybdenum acetylacetonate is used. In yet another preferred embodiment molybdenum octoate is used.

Solvents

When solvents are employed, appropriate polar or non-polar liquids or process fluids may be used. Such solvents may facilitate materials handling as well as promoting the uniform distribution of reactants. Particularly suitable solvents include volatile solvents which are readily removable from the final grafted polymer product after the reaction is complete. Solvents which may be used are those which can disperse or dissolve the components of the reaction mixture and which will not participate appreciably in the reaction or cause side reactions to occur to a material degree.

Several examples of solvents of this type include straight chain or branched aliphatic or alicyclic hydrocarbons, such as n-pentane, n-heptane, i-heptane, n-octane, i-octane, nonane, decane, cyclohexane, dihydronaphthalene, decahydronaphthalene and others. Specific examples of polar solvents include aliphatic ketones (for example, acetone), aromatic ketones, ethers, esters, amides, nitriles, sulfoxides such as dimethyl sulfoxide, water, etc. Non-reactive halogenated aromatic hydrocarbons such as chlorobenzene, dichlorobenzene, trichlorobenzene, dichlorotoluene and others are also useful as solvents. Combinations of solvents, for example, combinations of polar and non-polar liquids or process fluids, are also contemplated for use in the present invention.

Useful solvents also include base stocks or process fluids which are suitable for incorporation into a final lubricating oil product. Any base stock or process fluid may be used which can disperse or dissolve the remaining components of the reaction mixture without materially participating in the reaction or causing side reactions to an unacceptable degree. Hydroisomerized and hydrocracked base stocks, base stocks containing low or moderate levels of aromatic constituents, and fluid poly-α-olefins are contemplated for use herein. Aromatic constituents are desirably kept to low levels since aromatic materials may be reactive with each other or other reaction components in the presence of initiators. However, the use of base stocks or process fluids having aromatic constituents, while being less than optimum, is contemplated in the present invention. These include base stocks or process fluids containing less than 50 percent aromatics, preferably less than 25 percent aromatics, and more preferably less than 10 percent aromatics.

Suitable base stocks of this kind include the Group I, 100 SUS, 130 SUS, or 150 SUS low pour solvent neutral base oils, and the Group II EHC base stocks marketed by ExxonMobil; HT 60 (P 60 N), HT 70 (P 70 N), HT 100 (P 100 N), and HT 160 (P 160 N) marketed by PetroCanada; and RLOP stocks such as 100 N and 240 N sold by Chevron USA Products Co. In general, Group I, Group II, Group III, Group IV and Group V base stock categories are especially suitable for use. Aromatic-free stocks such as polyalpha-olefins ("PAO") may also be used as solvents.

Reaction Conditions for Solution Reaction

To prepare a multifunctional multiple-graft polymer of the present invention which displays dispersancy and good soot handling and viscosity, sludge and varnish control and good anti-wear properties, the respective monomer species which impart these performance characteristics are grafted onto the same polymer backbone. In order to generate a product exhibiting good dispersancy and good soot handling and viscosity, sludge and varnish control, and good anti-wear properties, an aforesaid coupling agent selected from the groups consisting of acylating agents and epoxides, preferably an acylating agent such as maleic anhydride, is grafted onto the polymer backbone in the presence of an initiator, thus forming an acylated polymer, for example, a product containing succinic anhydride (SA) coupling groups.

Next, the aforesaid ethylenically unsaturated monomer or monomer grouping associated with sludge and varnish handling, for example, N-vinylimidazole (VIMA), is introduced and grafted onto the polymer backbone, also in the presence of an initiator. Then, the aforesaid amine reactant or reactants capable of undergoing a condensation reaction with the coupling groups, such as the succinic anhydride groups noted above, are introduced and reacted with the coupling groups, thereby forming, for example, an amide, imide, or amic acid, depending on the amine reactant or reactants. Finally, an organo-metallic compound is grafted onto the polymer backbone.

Hence, the reactants comprise an aforesaid graftable polymer, an aforesaid graftable coupling agent, an amine capable of undergoing reaction with a coupling group on the polymer backbone, a graftable ethylenically unsaturated monomer group, an organo-metallic compound, and a free-radical initiator to promote the reactions of the coupling agent and ethylenically unsaturated monomer with the polymer. More than one type of each such reactant may be used, so the reactants may comprise one or more aforesaid graftable polymers selected from polyolefins and/or polyesters, one or more graftable coupling agents, one or more amines capable of undergoing reaction with a coupling group, one or more aforesaid graftable ethylenically unsaturated monomers, one or more organo-metallic compounds, and one or more free-radical initiators.

The multi-functional graft polymer of the present invention may be prepared either neat or in solution, or thermally in a melt reactor. In general, preparation of the multifunctional multiple-graft polymer of the present invention in solution is carried out as follows. The polymer to be grafted is provided in fluid form. For example, the polymer can be used neat or dissolved in a solvent, such as a hydrocarbon base oil suitable for use in a lubricating composition, or any other suitable solvent or process fluid. The neat polymer or solution of the polymer is then heated to an appropriate reaction temperature.

A graftable coupling agent is then introduced and grafted onto the polymer using an initiator such as a peroxide molecule, thereby forming a grafted polymer containing coupling groups. For example, when the coupling agent is maleic anhydride, a polymer having succinic anhydride coupling groups is formed. Subsequent to this reaction, an aforesaid graftable ethylenically unsaturated monomer is introduced and grafted onto the polymer backbone using an appropriate initiator. The next step in the preparation of the multifunctional multiple graft monomer polymer of the present invention is reaction of an aforesaid amine capable of undergoing a condensation reaction with the coupling groups on the polymer, for example, reacting the polymer having succinic anhydride coupling groups with either a primary or secondary amine. Finally, an organo-metallic compound is introduced and reacted with the grafted polymer. In general, the reaction temperature is maintained constant throughout the entire sequence of processes required for the preparation of the graft polymer.

More particularly, the polymer solution is placed into a suitable reactor such as a resin kettle, and the solution is heated, under inert blanketing, to the desired reaction temperature, and the reaction is carried out under the inert blanket. At a minimum, the reaction temperature should be sufficient to consume essentially all of the selected initiator during the time allotted for the reaction. For example, if di-t-butyl peroxide (DTBP) is used as the initiator, the reaction temperature should be greater than 165° C., preferably greater than 170° C., more preferably greater than 175° C. Different initiators work at different rates for a given reaction temperature. Therefore, the choice of a particular initiator may require adjustment of reaction temperature or time. It should be noted that once a temperature is adopted, the temperature, in general, is maintained constant throughout the entire sequence of processes required in the preparation of the multifunctional multi-graft polymer.

Grafting of the Coupling Agent

The coupling agent is added to the polymer solution and dissolved. The contemplated proportions of the coupling agent to polymer are selected so that an effective percentage will graft directly onto the polymer backbone. The mole ratio of coupling agent to polymer is in the range of from about 0.5, preferably from about 1.0, more preferably from about 1.5 moles, to about 12, preferably to about 11, more preferably to about 10 moles of coupling agent per mole of polymer backbone.

The mole ratio of the coupling agent to ethylenically unsaturated monomer is from about 1:20 to about 20:1, preferably from about 1:12 to about 12:1, more preferably from about 1:10 to about 10:1. Typically this mole ratio is about 8:1.

The graftable coupling agent may be introduced into the reactor all at once, in several discrete charges, or at a steady rate over an extended period. The desired minimum rate of addition of the graftable coupling agent to the reaction mixture is selected from:
  at least about 0.01%,
  alternatively at least about 0.05%,
  alternatively at least about 0.1%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 10%,
  alternatively at least about 20%,
  alternatively at least about 50%,
  alternatively at least about 100%,
of the necessary charge of graftable coupling agent per minute. Any of the above values can represent an average rate of addition or the minimum rate of addition. When added over time, the graftable coupling agent can be added as discrete charges, at an essentially constant rate or at a rate which varies with time.

The desired maximum rate of addition is selected from:
  at most about 0.5%,
  alternatively at most about 1%,
  alternatively at most about 2%,
  alternatively at most about 5%,
  alternatively at most about 10%,
  alternatively at most about 20%,
  alternatively at most about 50%,
  alternatively at most about 100%
of the necessary charge of graftable coupling agent per minute. Any of the above values can represent an average rate of addition or the maximum rate of addition.

The graftable coupling agent may be added as a neat liquid, in solid or molten form, or cut back with a solvent. While it may be introduced neat, it is typically cut back with a solvent to avoid localized concentrations of the monomer as it enters the reactor. The monomer can be diluted up to about 50 times, preferably up to about 20 times, more preferably up to about 10 times, most preferably up to 3 times, its weight or volume with a suitable solvent or dispersing medium.

Initiator

An initiator is added to the solution comprised of polymer and coupling agent. The initiator can be added before, with or after the graftable coupling agent. When adding the initiator, it may be added all at once, in several discrete charges, or at a steady rate over an extended period. For example, the initiator may be added so that, at any given time, the amount of unreacted initiator present is much less than the entire charge or, preferably, only a small fraction of the entire charge.

In one embodiment, the initiator may be added after substantially most or the entire graftable coupling agent has been added, so there is an excess of both the graftable coupling agent and the polymer during essentially the entire reaction. In another embodiment, the initiator may be added along with, or simultaneously with, the graftable coupling agent, either at essentially the same rate (measured as a percentage of the entire charge added per minute) or at a somewhat faster or slower rate, so there is an excess of polymer to unreacted initiator and unreacted coupling agent. For this embodiment, the ratio of unreacted initiator to unreacted coupling agent remains substantially constant during most of the reaction.

The contemplated proportions of the initiator to the graftable coupling agent and the reaction conditions are selected so that most, and ideally all of the graftable coupling agent will graft directly onto the polymer, rather than forming dimeric, oligomeric, or homopolymeric graft moieties or entirely independent oligomeric species. The contemplated minimum molar proportions of the initiator to the graftable coupling agent are from about 0.02:1 to about 2:1, alternatively from about 0.05:1 to about 2:1. No specific maximum proportion of the initiator is contemplated, though too much of the initiator may degrade the polymer, cause problems in the finished formulation and increase cost and, therefore, should be avoided.

The desired minimum rate of addition of the initiator to the reaction mixture is selected from:
  at least about 0.005%
  alternatively at least about 0.01%,
  alternatively at least about 0.1%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 20%
  alternatively at least about 50%,
  alternatively at least about 100%,
of the necessary charge of initiator per minute. Any of the above values can represent an average rate of addition or the minimum rate of addition. When the initiator is added over time, the initiator can be added as discrete charges, at an essentially constant rate or at a rate which varies with time.

The desired maximum rate of addition of the initiator to the reaction mixture is selected from:
  at most about 0.1%,
  alternatively at most about 0.5%,
  alternatively at most about 1%,
  alternatively at most about 2%,
  alternatively at most about 3%,
  alternatively at most about 4%,
  alternatively at most about 5%,
  alternatively at most about 10%,
  alternatively at most about 20%,
  alternatively at most about 50%
  alternatively at most about 100%,
of the necessary charge of initiator per minute. Any of the above values can represent an average rate of addition or the maximum rate of addition.

While the initiator can be added neat, it is typically cut back with a solvent to avoid high localized concentrations of the initiator as it enters the reactor. The initiator can be diluted by up to about 50 times, preferably up to about 10 times, more preferably up to about 3 times its weight or volume with a suitable solvent or dispersing medium.

Grafting of the Ethylenically Unsaturated Monomer

As noted above, the temperature, in general, will remain constant throughout preparation of the graft polymer. Hence, while at temperature, one or more aforesaid ethylenically unsaturated, aliphatic or aromatic monomers associated with sludge and varnish handling, for example, VIMA, are introduced along with an initiator. The contemplated proportions of the aforesaid ethylenically unsaturated monomer containing at least one of nitrogen and oxygen to the aforesaid graftable polymer are selected so that an effective percentage of the monomer will graft directly onto the polymer backbone, rather than forming dimeric, oligomeric or homopolymers graft moieties, or entirely independent homopolymers. At the same time a high loading of ethylenically unsaturated monomers onto the polymeric backbone is contemplated. The mole ratio of the ethylenically unsaturated monomer to the graftable polymer is from about 0.5, preferably from about 1.0, more preferably from about 1.5 to about 12, preferably to about 11, more preferably to about 10.

The graftable, aforesaid ethylenically unsaturated monomer may be introduced into the reactor as several discrete charges, at an essentially constant rate, at a rate which varies with time, or all at once. The desired minimum rate of addition of the graftable, aforesaid ethylenically unsaturated monomer to the reaction mixture is selected from:
  at least about 0:01%,
  alternatively at least about 0.05%,
  alternatively at least about 0.1%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 10%,
  alternatively at least about 20%, of the necessary charge of such graftable monomer per minute. When added over time, the monomer can be added at an essentially constant rate, or at a rate which varies with time. Any of the above values can represent an average rate of addition or the minimum value of a rate which varies with time.

The desired maximum rate of addition is selected from:
  at most about 0.5%,
  alternatively at most about 1%,
  alternatively at most about 2%,
  alternatively at most about 5%,
  alternatively at most about 10%,
  alternatively at most about 20%,
  alternatively at most about 50%,
  alternatively at most about 100% of the necessary charge of graftable monomer per minute. Any of the above values can represent an average rate of addition or the maximum value of a rate which varies with time.

The graftable monomer may be added as a neat liquid, in solid or molten form, or cut back with a solvent. While it may be introduced neat, it is typically cut back with a solvent to avoid localized concentrations of the monomer as it enters the reactor. The monomer can be diluted by up to about 50 times, preferably up to about 10 times, more preferably up to about 3 times its weight or volume with a suitable solvent or dispersing medium.

The initiator can be added before, with or after the graftable monomer. It may be added into the reactor all at once, in several discrete charges, or at a steady rate over an extended period. For example, the initiator may be added so that, at any given time, the amount of unreacted initiator present is much less than the entire charge or, preferably, only a small fraction of the entire charge. In one embodiment, the initiator may be added after substantially most or all of the monomer has been added, so there is an excess of both the monomer and the polymer during essentially the entire reaction. In another embodiment, the initiator may be added along with the monomer, either at essentially the same rate (measured as a percentage of the entire charge added per minute) or at a somewhat faster or slower rate, so there is an excess of polymer to unreacted initiator and unreacted monomer.

The contemplated proportions of the initiator to the monomer and the reaction conditions are selected so that most, and ideally, all of the monomer will graft directly onto the polymer, rather than forming dimeric, oligomeric, or homopolymeric graft moieties or entirely independent polymers. The contemplated minimum molar proportions of the initiator to the aforesaid ethylenically unsaturated, aliphatic or aromatic monomer are from about 0.02:1, preferably from about 0.05:1 to about 2:1. No specific maximum proportion of the initiator is contemplated, though too much of the initiator may degrade the polymer or, cause problems in the finished formulation and increase cost and, therefore, should be avoided.

As noted, the initiator may be introduced into the reactor in several (or, alternatively, many) discrete charges, or at a steady rate over an extended period. The desired minimum rate of addition of the initiator to the reaction mixture is selected from:
  at least about 0.005%
  alternatively at least about 0.01%,
  alternatively at least about 0.1%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 20%, of the necessary charge of initiator per minute. The initiator can be added at an essentially constant rate, or at a rate which varies with time. Any of the above values can represent an average rate of addition or the minimum value of a rate which varies with time.

The desired maximum rate of addition of the initiator to the reaction mixture is selected from:
  at most about 0.1%,
  alternatively at most about 0.5%,
  alternatively at most about 1%,
  alternatively at most about 2%,
  alternatively at most about 3%,
  alternatively at most about 4%,
  alternatively at most about 5%,
  alternatively at most about 10%,
  alternatively at most about 20%
  alternatively at most about 40%, of the necessary charge of initiator per minute. Any of the above values can represent an average rate of addition or the maximum value of a rate which varies with time.

While the initiator can be added neat, it is typically cut back with a solvent to avoid localized concentrations of the initiator as it enters the reactor. The initiator can be diluted by up to about 50 times, preferably up to about 20 times, more preferably up to about 10 times, most preferably up to about 3 times its weight or volume with a suitable solvent or dispersing medium. The reaction is allowed to proceed to the extent required by the particular reactants.

Formation of the Reaction Product of the Amine and Grafted Coupling Group

The next step in the preparation of the multifunctional multiple-graft polymer of the present invention is conversion of the coupling groups, typically acyl groups, on the acylated polymer, for example, a succinic anhydride substituent on the polymer, into the soot handling moiety via a condensation reaction with the amine reactant or reactants. The solution may be maintained either at an elevated temperature, such as a temperature appropriate for carrying out the grafting reaction, or the temperature may be decreased to a temperature at which the condensation reaction does not occur. If the reactor temperature is decreased, the amine reactant may be introduced into the reactor all at once and blended into the polymer solution, and the reactor temperature is then raised to carry out the reaction between the acylated polymer and the amine reactant. Alternatively, the reactor may be maintained at an elevated temperature, and the amine reactant is then fed to the reactor relatively slowly, allowing for the reaction between the acylated polymer and the amine reactant to proceed. The reactants are maintained at temperature until the reaction with the amine is complete, thereby forming the amine-coupling group reaction product. An inert blanket may be maintained during this stage of preparation of the graft polymer.

The amine reactant may be introduced into the reactor in several discrete charges, at a constant rate over an extended period of time, at a rate which varies with time, or all at once. That is, the rate of addition of amine reactant is as follows:
  at least about 0.2%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 20%
  alternatively at least about 50%,
  alternatively at least about 100%, of the necessary charge of amine reactant per minute. Any of the above values can represent an average rate of addition or the minimum value of a rate which varies with time.

After the reaction has gone essentially to completion, the heat is removed and the reaction product is allowed to cool in the reactor with mixing or it may be removed prior to cooling.

Formation of the Final Multifunction Multigraft Polymer Product

After addition of the graftable amine is completed, the reaction mixture is preferably mixed with heating for an additional 2-120 minutes, for completion of the condensation reaction. The time required for completion of the reaction can be determined by experiment, by determining when the proportion of nitrogen, or of the amine in solution, reaches a value at or approaching a minimum pre-established value, or when the viscosity approaches a near constant value. The test method used to determine percent nitrogen can be found in the aforesaid U.S. Pat. No. 5,523,008 column 11, line 35 to column 12, line 67.

The reaction temperature is maintained, and the organo-metallic compound associated with anti-wear is introduced. The contemplated proportions of the organo-metallic compound to graftable polymer are selected so that an effective percentage will coordinate or react with the graftable polymer. The organo-metallic compound may be introduced into the reactor all at once, in several discrete charges, or at a steady rate over an extended period. The desired minimum rate of addition of the organo-metallic compound to the reaction mixture is at least about 0.1% and the maximum rate of addition is 100% of the necessary charge of organo-metallic compound per minute.

The solution is mixed thoroughly to incorporate the organo-metallic compound into the reaction mixture. After addition of organo-metallic compound is completed, the reaction mixture is preferably mixed with heating and a $CO_2$ purge for an additional 2-120 minutes, to completion.

Graft Monomer Ratios

The contemplated mole ratios of the coupling agent to the aforesaid amine in forming the amine-coupling agent reaction are about 1:10 to about 6:1, preferably from about 1:3 to about 4:1, more preferably from about 1:2 to about 4:1, or most preferably from about 1:2 to about 2:1. For example, for the succinic anhydride polymer substituent the preferable mole ratio of the coupling agent to the aforesaid amine is from about 2:1 to 1:2 and more preferably is about 1:1.

The mole ratios of product formed by the reaction of the coupling groups and amine to the graftable polymer are understood to be the same as those noted above for the coupling agent, namely, from about 0.5, preferably from about 1, more preferably from about 1.5, to about 12, preferably to about 11, more preferably to about 10 moles of such reaction product per mole of the polymer.

The mole ratio of the organo-metallic compound to the graftable polymer is from about 40:1, preferably from about 20.1, to about 2:1, preferably to about 5:1, and most preferably is about 12:1. The mole ratio of the organo-metallic compound to the ethylenically unsaturated monomer is from about 40:1, preferably from about 30:1, more preferably from about 20:1, to about 15:1, preferably to about 10:1, more preferably to about 8:1. The mole ratio of the organo-metallic compound to the reaction product of the amine and the coupling groups is from about 40:1, preferably from about 30:1, more preferably from about 20:1, to about 10:1, preferably to about 8:1, more preferably to about 4:1.

It is contemplated that the ratio of the total concentration of graft monomers comprising the amine-coupling group reaction product, the ethylenically unsaturated nitrogen and/or oxygen-containing monomer, and the organo-metallic monomer to the polymer backbone should be from about 0.5, preferably from about 1, more preferably from about 2, most preferably from about 3, to about 20, preferably to about 10, more preferably to about 7.

Based upon these graft concentrations, the multifunctional multiple-graft polymer of the present invention may contain about 0.5 moles of the amine-coupling group reaction product soot controlling monomer and about 0.5 moles of the ethylenically unsaturated sludge and varnish controlling monomer per mole of polymer. The multifunctional multiple-graft polymer of the present invention may be formulated to contain about 2 moles of the amine-coupling group reaction product soot controlling monomer and about 4 moles of the ethylenically unsaturated nitrogen and/or oxygen-containing monomer sludge and varnish controlling monomer per mole of polymer. The multifunctional multiple-graft monomer graft polymer of the present invention may be formulated to contain about 3 moles of the amine-coupling group reaction product soot controlling monomer and about 1 mole of the ethylenically unsaturated monomer sludge and varnish controlling monomer per mole of polymer.

As noted, the mole ratios of each of the grafted substituents, namely, the amine-coupling group reaction product and the ethylenically unsaturated monomer, to the polymer backbone range from 0.5 to 12. Based upon this range of mole ratios of each of the grafted substituents, namely, the amine-coupling group reaction product and the ethylenically unsaturated monomer, to the polymer backbone, the relative mole ratios of one substituent to the other may range from about 1 to about 20. For example, if one substituent has a mole ratio to polymer of 0.1:1 and the other has a mole ratio of 1:1, then the relative mole ratio is 10:1.

Melt Reaction Conditions for Preparation of Multifunctional Graft Polymers

The grafting reaction can be carried out under polymer melt reaction conditions in an extrusion reactor, a heated melt-blend reactor, a Banbury mill or other material blenders or mixers, for example, an extruder. The term extruder used in this specification should be understood as being exemplary of the broader class of blenders or mixers which may be used for melt-blending according to the present invention.

To carry out the melt reaction, it is desirable to establish suitable process design parameters for the reactive extruder to insure that the unit is capable of achieving the operating parameters and conditions needed in order to generate the desired product or products. The operating conditions and parameters appropriate for carrying out reactive extrusion include, but are not limited to, criteria for the reactant addition ports, the reactant feed systems which include feed rate controllers and monitors, the polymer feed system which includes the polymer feed port, feed rate controllers and monitors.

In addition to the above noted feed considerations, criteria for the extruder design are to be considered. These include, among others, the screw design and its size, barrel diameter and length, die configuration and open cross-section, systems for heating the extruder, or at times cooling the extruder and for controlling extruder temperature, such as, barrel temperature and die temperature, screw speed, and both pre-extrusion and post-extrusion conditions. The precise conditions are established by those skilled in the art to meet the product targets. It should be noted that during its operation, the extruder can be maintained under essentially aerobic conditions, or may be purged or blanketed with an appropriate inserting material to create anaerobic or near anaerobic operating conditions.

The appropriate reactant feed concentrations and conditions may be based upon the ranges disclosed above for the solvent based grafting reaction. These include the appropriate feed rates, concentrations and conditions of the polymer or polymers, the graftable monomers such as the graftable ethylenically unsaturated monomer or monomers, the acylating agent or agents, the initiator or initiators, the amine reactant or reactants, and the organo-metallic compound or compounds. Examples of the concentrations and conditions referred to include, among others, the relative concentrations of the graftable ethylenically unsaturated monomer and of the acylating agent to both the polymer and the initiator, and also of the relative concentrations of amine reactant to acylating agent and of the organo-metallic compound to graftable polymer or to the ethylenically unsaturated monomer.

The contemplated minimum and maximum molar proportions are, in general, the same as those previously identified for the solvent based reactions. As had been outlined for the solvent based reactions, the reactants may be fed to the extruder, either, as a mixture of components or separately, as individual components.

The reactants may be added either neat, or "cut-back" or diluted with solvent in order to avoid localized regions of elevated species concentration and as a method of controlling reactant feed. Representative solvents include volatile as well as non-volatile fluids. The solvents considered include base oils conventionally used in lubricant compositions, as defined in this specification, mineral spirits, non-polar solvents, polar solvents and other solvents known to those skilled in the art, which includes solvents such as water, methanol and acetone.

The concentration of reactant, relative to solvent, may range from about 10 wt % to about 90 wt %. In general, the concentrations and conditions for carrying out the grafting reaction via reactive extrusion are chosen in order to promote grafting of the reactive reagents directly onto the polymer, rather than the reagents reacting to form dimeric, oligomeric, or homopolymeric graft moieties or, even, independent homopolymers. Typically the reactants are introduced either neat or "cut-back" with, for example, 75% solvent in order to avoid localized regions of elevated concentration, as noted above.

In carrying out the graft reaction, the polymer, essentially as a "neat" material, is fed to the extruder at a constant rate and brought to its appropriate reaction condition. The graftable acylating agents, the graftable ethylenically unsaturated monomers, the initiators, the amine compounds, and the organo-metallic compounds are also metered into the extruder at a constant rate. This may be done either through the same feed port as that of the polymer or through separate reactant feed ports. That is, the graftable reactants and initiator may be fed, essentially, together with the polymer into the same extruder zone and, thereby, reacted with the reactants, or, alternatively, delivery of the graftable reagents and initiator may be somewhat delayed, by being introduced downstream from the polymer feed port into reaction zones which are separated from the polymer feed port by appropriate screw seal elements.

With respect to the initiator, it may be introduced, either before, together with, or after the respective graftable reagents, namely, either into the same extruder zone or into zones which are either before or after the graftable reactant, the zones established by appropriate screw seal elements. The feed rates of graftable reagents, namely, the acylating agents and ethylenically unsaturated monomers and of initiator and their respective concentrations relative to polymer are adjusted and maintained to yield the desired product composition. In addition to the graftable reagents, the amine capable of reacting with the acylating group and the organo-metallic compound may be fed to the extruder, downstream from the grafted polymer to complete the preparation of the multifunctional dispersant graft polymer.

In one embodiment of the preparation of the multifunctional multiple graft polymer, only one graftable reagent, either the acylating agent or the graftable ethylenically unsaturated monomer, may be grafted onto the polymer via extrusion while the other graft reagent may be grafted via the solution process. Similarly, the amine which undergoes the condensation reaction with the acylating group may be reacted in the extruder or in solution.

One or more polymers, acylating agents, graftable ethylenically unsaturated monomers, initiators, amines and organo-metallic compounds may be used to produce the multifunctional graft polymer of the present invention. In a preferred embodiment, one polymer, one acylating agent, one grabble ethylenically unsaturated monomer, one or more initiators, one amine and one organo-metallic compounds may be used. In alternate embodiments, more than one polymer, more than one acylating agent more than one graftable ethylenically unsaturated monomer, more than one initiator, more than one amine and more than one organo-metallic compounds may be used. In addition, the polymer reactant may be comprised of both low and high molecular weight polymers.

In alternate embodiments of this invention, as explained above, the graftable monomers, namely, the acylating monomer, the ethylenically unsaturated monomer comprising of nitrogen and/or oxygen, and combinations thereof, and the initiator may be introduced together at the appropriate relative concentrations. By carefully selecting the operating conditions, in terms of residence times, extruder zone temperatures, screw speed, reactant feed rates, for example, the extruder process may be customized for various polymers disclosed herein, any of the graftable monomers disclosed herein, the initiators disclosed herein, and, if required, inhibitors, to yield product having a wide range of monomer to polymer ratios or other specifically desired properties.

The melt reaction product may be used either neat, or dissolved in an appropriate solvent. In a preferred embodiment, the final grafted polymer product is dissolved in an appropriate solvent or base stock in order to facilitate handling of the final graft polymer product and to facilitate lubricant blending using the final graft product.

In a preferred embodiment, the reactants, for example, the acylating agent or acylating agents, the graftable ethylenically unsaturated monomer or monomers, the initiator or initiators, the amine or amines and the organo-metallic compound or compounds for the condensation reaction, are fed separately. It is also preferred that the graftable polymer be the first reactant which is fed to the extruder.

The melt reaction may also be carried out using a mixture of two polymers. The two polymers may be fed to the extruder either simultaneously or separately. The two polymers may be blended together, either prior to introduction into the extruder or, if two separate polymer feeds are employed, the polymer blending may be carried out in the extruder. Blending of the two polymers prior to the introduction of the other reactants, namely the acylating agent, the graftable ethylenically unsaturated monomer, the initiator, the amine capable of reaction with the acylated polymer, and the organo-metallic compound is preferred.

Alternatively, the two polymers may be fed, separately, into the reaction zones and, at that point, reacted simultaneously with the acylating agent, the graftable ethylenically unsaturated monomer, the initiator, the amine capable of reaction with the acylated polymer, and the organo-metallic compound. Alternatively, the multifunctional graft product of both polymers may be generated by initially carrying out a graft reaction in the extruder and following this graft reaction by reaction in a solvent, namely, completing generation of the multifunctional product in solution. In a preferred embodiment, the polymer should be the first reactant fed to the extruder.

This melt reaction process can also be used to make multifunction multiple graft polymers other than the multifunction multiple graft polymer of the present invention.

Lubricating Oil Compositions

The lubricating oil compositions of the present invention preferably comprise the following ingredients in the stated proportions:

A. from about 60%, preferably from about 65%, more preferably from about 70%, to about 99% by weight, of one or more base oils;
B. from about 0.02%, preferably from about 0.05%, more preferably from about 0.15%, most preferably from about 0.25%, to about 20%, preferably to about 10%, more preferably to about 5% most preferably to 2% by weight of one or more of the multifunctional multiple-graft monomer graft polymers of the present invention;
C. from about 0.0%, preferably from about 0.05%, more preferably from about 0.15%, most preferably from about 0.1%, to about 15%, preferably to about 10%, more preferably to about 5%, most preferably to about 2.5% by weight of one or more other grafted polymers;
D. from about 0.0%, preferably from about 0.5%, more preferably from about 0.15%, most preferably from about 0.1%, to about 15%, preferably to about 10%, more preferably to about 5%, most preferably to about 2.5% by weight of one or more polymers other than grafted polymers;

E. from 0.0%, preferably from about 0.2%, more preferably from about 0.5%, most preferably from about 0.7%, to about 15%, preferably to about 10%, more preferably to about 8%, most preferably to about 6% by weight of one or more dispersants which are not grafted according to the present invention;

F. from about 0.1%, preferably from about 0.3%, more preferably from about 0.5% to about 10%, preferably to about 8%, more preferably to about 6%, most preferably to about 4% by weight, of one or more detergents;

G. from about 0.01%, preferably from about 0.04%, more preferably from about 0.06%, to about 5%, preferably to about 3%, more preferably to about 2% by weight of one or more anti-wear agents;

H. from about 0.01%, preferably from about 0.05%, more preferably from about 0.1% to about 5%, preferably to about 3%, more preferably to about 2.5%, most preferably to about 2% by weight of one or more anti-oxidants; and I. from about 0.0%, preferably from about 0.005%, to about 4%, preferably to about 3%, more preferably to about 2%, most preferably to about 1.5% by weight of minor ingredients such as friction modifiers, pour point depressants, and anti-foam agents.

The percentages of C through I may be calculated based on the form in which they are commercially available. The function and properties of each ingredient identified above and several examples of such ingredients are summarized below.

Base Oils

Any of the petroleum or synthetic base oils (Groups I, II, III, IV and V) previously identified as being suitable as solvents or process solvents for the graftable polymers of the present invention can be used as the base oil. Indeed, any conventional lubricating oil or combinations thereof may also be used.

Multifunctional Multiple-Graft Monomer Polymers

The multifunctional multiple-graft monomer graft polymers of the present invention can be used in place of part or all of the dispersants used in such lubricating oil formulations. It can also be used to replace part or all of the agents used to control soot, sludge, varnish and wear that are conventionally used in such formulations, as the multifunctional multiple-graft monomer graft polymers of the present invention possess soot handling, sludge, varnish and wear control, and dispersancy properties. Grafted polyolefins and/or polyesters disclosed in the prior art can also be used in combination with the multifunctional multiple-graft monomer graft polyolefins and/or graft polyesters of the present invention.

Grafted and Non-Grafted Viscosity Modifiers

The conventional viscosity index improving polymers, including, for example, polyolefins and polyesters, can be used in the lubricating oil formulations of the present invention. Several examples of polymers contemplated for use herein include those suggested at column 1, lines 29-32 of U.S. Pat. No. 4,092,255, the disclosure of which in its entirety is incorporated herein by reference: polyisobutenes, polymethacrylates, polyalkylstyrenes, hydrogenated and partially hydrogenated low molecular weight polymers of butadiene and styrene, amorphous polyolefins of ethylene and propylene, ethylene-propylene diene low molecular weight polymers, polyisoprene, and styrene-isoprene. Similarly, functionalized polyolefins such as those disclosed in U.S. Pat. Nos. 4,092,255 and 5,814,586 and references cited therein, which are incorporated in their entirety, are contemplated for use herein.

Dispersants

Dispersants help suspend insoluble engine oil oxidation products, thus preventing sludge flocculation and precipitation or deposition of particulates on metal parts. Suitable dispersants include alkyl succinimides such as the reaction products of oil-soluble polyisobutylene succinic anhydride with ethylene amines such as tetraethylene pentamine and borated salts thereof.

Such conventional dispersants are contemplated for use herein. Several examples of dispersants include those listed in U.S. Pat. No. 4,092,255 at column 1, lines 38-41: succinimides or succinic esters, alkylated with a polyolefin of isobutene or propylene, on the carbon in the alpha position of the succinimide carbonyl. These additives are useful for maintaining the cleanliness of an engine or other machinery.

Detergents

Detergents used to maintain engine cleanliness can be incorporated in the present lubricating oil compositions. These materials include the metal salts of sulfonic acids, alkyl phenols, sulfurized alkyl phenols, alkyl salicylates, naphthenates, and other soluble mono- and dicarboxylic acids. Basic (vis, overbased) metal salts, such as basic alkaline earth metal sulfonates (especially calcium and magnesium salts) are frequently used as detergents. Such detergents are particularly useful for keeping the insoluble particulate materials in an engine or other machinery in suspension. Other examples of detergents contemplated for use herein include those recited in U.S. Pat. No. 4,092,255, at column 1, lines 35-36: sulfonates, phenates, or organic phosphates of polyvalent metals.

Anti-Wear Agents

Anti-wear agents, as their name implies, reduce wear of metal parts. Zinc dialkyldithiophosphates and zinc diaryldithiophosphates and organo molybdenum compounds such as molybdenum dialkyldithiocarbamates are representative of conventional anti-wear agents.

Anti-Oxidants

Oxidation inhibitors, or anti-oxidants, reduce the tendency of lubricating oils to deteriorate in service. This deterioration can be evidenced by increased oil viscosity and by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, dioctylphenylamine, phenyl-alpha-naphthylamine, phosphosulfurized or sulfurized hydrocarbons, and organo molybdenum compounds such as molybdenum dialkyldithiocarbamates.

Use of the above conventional additives may be reduced or eliminated by the use of the multifunctional multiple-graft polymer of the present invention.

Minor Ingredients

Other minor ingredients are contemplated for incorporation in the lubricating oil compositions containing the multifunctional multiple-graft polymer of the present invention. A non-exhaustive list of such additives includes pour point depressants, rust inhibitors, as well as extreme pressure additives, friction modifiers, seal swell agents, antifoam additives, and dyes.

EXAMPLE 1

A 1000 ml resin kettle equipped with an electric heating mantle, stirrer, thermometer, metering syringe pump feed system and a gas inlet is charged with 500 grams of a solution containing 12.5% by weight of an ethylene-propylene polymer having a weight average molecular weight of 150,000 in a hydrotreated base stock.

The gas inlet permits the gas to be fed either below or above the surface of the solution. The solution is heated to 170° C. and maintained at temperature throughout the preparation. During heating, the ethylene-propylene polymer is purged with an inerting gas ($CO_2$) fed below the surface of the solution. When the solution reaches the temperature of 170° C., the purge gas is redirected to flow over the surface of the polymer. The flow of the blanketing gas is maintained throughout the preparation of the graft product.

A single charge of about 2.94 grams (0.31 mole) of maleic anhydride is added to the polymer and dissolved. This is followed by the 120 minutes metered addition to the reactor of a solution containing about 1.5 grams (0.010 mole) di-t-butyl peroxide (DTBP) dissolved in about 50 grams of heptane. The grafting reaction is allowed to continue for 30 minutes beyond the 60 minutes allotted for the initiator feed. The purge gas is then redirected to flow under the polymer solution for 4 hours in order to strip the unreacted maleic anhydride and heptane. The DTBP promoted grafting of the maleic anhydride onto the forming the corresponding succinic anhydride (SA) acylated graft product.

The next step is grafting of 1-vinylimidazole (VIMA) onto the acylated polymer prepared in the previous step. To carry out this segment of the preparation, two solutions are prepared, one containing about 2.5 grams (0.027 mole) of VIMA dissolved in about 50 gms of acetone and the other containing about 1.5 grams (0.010 mole) of DTBP dissolved in about 50 grams of heptane. Using syringe pumps, these solutions are delivered simultaneously to the reactor over a 60 minutes period. The grafting reaction is then allowed to proceed for an additional 30 minutes beyond the 60 minutes allotted for the initiator feed. After the VIMA reaction is essentially complete a charge of about 5.70 grams (0.031 mole) of N-phenyl-1,4-phenylenediamine is slowly added to the mixture and reacted with the acyl groups on the dual graft polymer formed in the previous steps over a period of 4 hours, thereby generating the dual-monomer graft polymer product. Again, the purge gas is redirected to flow under the polymer solution in order to strip the volatiles such as the heptane and acetone.

To this product is added 0.50% by weight (containing 2.5 grams) of molybdenum acetylacetonate (Mo AcAc) (Gelest Inc. #-AKM550). This is added over a 1 minute period to the polymer mixture and allowed to mix thoroughly. After the monomer is incorporated to the reaction mixture the reaction is allowed to continue mixing with heating and a $CO_2$ purge for 60 additional minutes.

The resulting product contains the multiple function graft polymer of the present invention.

EXAMPLE 2

A 500 ml resin kettle equipped with an electric heating mantle, stirrer, thermometer, metering syringe pump feed system and a gas inlet is charged with 500 grams of a solution containing 12.5% by weight of an ethylene-propylene polymer having a weight average molecular weight of 75,000 in a hydrotreated base stock.

The gas inlet permits the gas to be fed either below or above the surface of the solution. The solution is heated to 170° C. and maintained at temperature throughout the preparation. During heating, the polymer is purged with an inerting gas ($CO_2$) fed below the surface of the solution. When the solution reaches the temperature of 170° C., the purge gas is redirected to flow over the surface of the polymer. The flow of the blanketing gas is maintained throughout the preparation of the graft product.

A single charge of about 2.94 grams (0.031 mole) of maleic anhydride is added to the polymer and dissolved. This is followed by the 120 minutes metered addition to the reactor of a solution containing about 1.5 grams (0.01 mole) di-t-butyl peroxide (DTBP) dissolved in about 30 grams of heptane. The grafting reaction is allowed to continue for 30 minutes beyond the 60 minutes allotted for the initiator feed. The purge gas is then redirected to flow under the polymer solution for 4 hours in order to strip the unreacted maleic anhydride and heptane. The DTBP promoted grafting of the maleic anhydride onto the polymer forming the corresponding succinic anhydride (SA) acylated graft product.

The next step is grafting of 1-vinylimidazole (VIMA) onto the acylated polymer prepared in the previous step. To carry out this segment of the preparation, two solutions are prepared, one containing about 2.50 grams (0.027 mole) of VIMA dissolved in about 30 gms of acetone and the other containing about 1.50 grams (0.010 mole) of DTBP dissolved in about 30 grams of heptane. Using syringe pumps, these solutions are delivered simultaneously to the reactor over a 60 minutes period. The grafting reaction is then allowed to proceed for an additional 30 minutes beyond the 60 minutes allotted for the initiator feed. After the VIMA reaction is essentially complete a charge of about 5.70 grams (0.031 mole) of N-phenyl-1,4-phenylenediamine is slowly added to the mixture and reacted with the acyl groups on the dual graft polymer formed in the previous steps over a period of 4 hours, thereby, generating the dual-monomer graft polymer product. Again, the purge gas is redirected to flow under the polymer solution in order to strip the volatiles such as the heptane and acetone.

At this time 0.50% by weight of molybdenum acetylacetonate available from Gelest Inc. (#-AKM550) is added to the polymer mixture over a 1 minute period and allowed to mix thoroughly. After the monomer is incorporated to the reaction mixture, 0.30% by weight of di-t-butyl peroxide (DTBP Aldrich Chemical #16,8521-1) is added over a 60-minute period. Upon completion of the DTBP addition, the reaction is allowed to continue mixing with heating for 30 additional minutes.

The resulting product contains the multiple function (viscosity index improver, dispersant, anti-wear) graft polymer of the present invention.

EXAMPLE 3

A 500 ml resin kettle equipped with an electric heating mantle, stirrer, thermometer; metering syringe pump feed system and a gas inlet is charged with 500 grams of a solution containing 12.5% by weight of an ethylene-propylene polymer having a weight average molecular weight of 150,000 in a hydrotreated base stock. The solution is prepared by dissolving about 62.5 grams (0.0175 mole) of the polymer, in 437.5 grams of a commercially available hydrorefined base stock.

The gas inlet permits the gas to be fed either below or above the surface of the solution. The solution is heated to 170° C. and maintained at temperature throughout the preparation. During heating, the polymer solution is purged with an inerting gas ($CO_2$) fed below the surface of the solution. When the solution reaches the temperature of 170° C., the purge gas is redirected to flow over the surface of the polymer solution. The flow of the blanketing gas is maintained throughout the preparation of the graft product.

A single charge of about 5.7 grams (0.058 mole) of maleic anhydride is added to the polymer solution and dissolved. This is followed by the 120 minutes metered addition to the reactor of a solution containing about 2.77 grams (0.019 mole) di-t-butyl peroxide (DTBP) dissolved in about 20 grams of heptane. The grafting reaction is allowed to continue for 30 minutes beyond the 60 minutes allotted for the initiator feed. The purge gas is then redirected to flow under the polymer solution for 4 hours in order to strip the unreacted maleic anhydride and heptane. The DTBP promoted grafting of the maleic anhydride onto the polymer forming the corresponding succinic anhydride (SA) acylated graft product.

The next step is grafting of 1-vinylimidazole (VIMA) onto the acylated polymer prepared in the previous step. To carry out this segment of the preparation, two solutions are prepared, one containing about 5.3 grams (0.058 mole) of VIMA dissolved in about 20 gms of acetone and the other containing about 2.77 grams (0.019 mole) of DTBP dissolved in about 15 gms of heptane. Using syringe pumps, these solutions are delivered simultaneously to the reactor over a 60 minutes period. The grafting reaction is then allowed to proceed for an additional 30 minutes beyond the 60 minutes allotted for the initiator feed. After the VIMA reaction is essentially complete a charge of about 5.3 grams (0.029 mole) of N-phenyl-1,4-phenylenediamine is slowly added to the mixture and reacted with the acyl groups on the dual graft polymer formed in the previous steps over a period of 4 hours, thereby, generating the dual-monomer graft polymer product. Again, the purge gas is redirected to flow under the polymer solution in order to strip the volatiles such as the heptane and acetone.

To the resulting product is added 2.00% by weight of molybdenum octoate from Shepherd Chemical Co. This is added over a 1 minute period to the polymer mixture and allowed to mix thoroughly. After the monomer is incorporated to the reaction mixture, the reaction is allowed to continue mixing with heating and a $CO_2$ purge for 60 additional minutes.

The resulting product contains the multiple function (viscosity index improver, dispersant, anti-wear) graft polymer of the present invention.

EXAMPLE 4

A 500 ml resin kettle equipped with an electric heating mantle, stirrer, thermometer, metering syringe pump feed system and a gas inlet is charged with 500 grams of a solution containing 12.5% by weight of an ethylene-propylene polymer having a weight average molecular weight of 150,000 in a hydrotreated base stock.

The gas inlet permits the gas to be fed either below or above the surface of the solution. The solution is heated to 170° C. and maintained at temperature throughout the preparation. During heating, the polymer is purged with an inerting gas ($CO_2$) fed below the surface of the solution. When the solution reaches the temperature of 170° C., the purge gas is redirected to flow over the surface of the polymer. The flow of the blanketing gas is maintained throughout the preparation of the graft product.

A single charge of about 2.94 grams (0.031 mole) of maleic anhydride is added to the polymer and dissolved. This is followed by the 120 minutes metered addition to the reactor of a solution containing about 1.5 grams (0.010 mole) di-t-butyl peroxide (DTBP) dissolved in about 30 grams of heptane. The grafting reaction is allowed to continue for 30 minutes beyond the 60 minutes allotted for the initiator feed. The purge gas is then redirected to flow under the polymer solution for 4 hours in order to strip the unreacted maleic anhydride and heptane. The DTBP promoted grafting of the maleic anhydride onto the polymer forming the corresponding succinic anhydride, the acylated graft product.

The next step is grafting of 1-vinylimidazole (VIMA) onto the acylated polymer prepared in the previous step. To carry out this segment of the preparation, two solutions are prepared, one containing about 2.5 grams (0.027 mole) of VIMA dissolved in about 40 gms of acetone and the other containing about 1.5 (0.010 mole) grams of DTBP dissolved in about 40 grams of heptane. Using syringe pumps, these solutions are delivered simultaneously to the reactor over a 60 minutes period. The grafting reaction is then allowed to proceed for an additional 30 minutes beyond the 60 minutes allotted for the initiator feed. After the VIMA reaction is essentially complete a charge of about 5.7 grams (0.031 mole) of N-phenyl-1,4-phenylenediamine is slowly (over 4 hours) added to the mixture and reacted with the acyl groups on the dual graft polymer formed in the previous steps over a period of 4 hours, thereby, generating the dual-monomer graft polymer product. Again, the purge gas is redirected to flow under the polymer solution in order to strip the volatiles such as the heptane and acetone.

To the resulting product is added 8.0% by weight of Molybdenum boro-neodecanoate (Mo boro NDA). This is added over a 1 minute period to the polymer mixture and allowed to mix thoroughly. After the monomer is incorporated to the reaction mixture, the reaction is allowed to continue mixing with heating and a $CO_2$ purge for 60 additional minutes.

The resulting product contains the multiple function (viscosity index improver, dispersant, anti-wear) graft polymer of the present invention containing VIMA and molybdenum boro-neodecanoate.

EXAMPLE 5

A 500 ml resin kettle equipped with an electric heating mantle, stirrer, thermometer, metering syringe pump feed system and a gas inlet is charged with 500 grams of a solution containing 12.5% by weight of an ethylene-propylene polymer having a weight average molecular weight of 75,000 in a hydrotreated base stock.

The gas inlet permits the gas to be fed either below or above the surface of the solution. The solution is heated to 170° C. and maintained at temperature throughout the preparation. During heating, the polymer is purged with an inerting gas ($CO_2$) fed below the surface of the solution. When the solution reaches the temperature of 170° C., the purge gas is redirected to flow over the surface of the polymer. The flow of the blanketing gas is maintained throughout the preparation of the graft product.

A single charge of about 2.94 grams (0.031 mole) of maleic anhydride is added to the polymer and dissolved. This is followed by the 120 minutes metered addition to the reactor of a solution containing about 1.5 grams (0.01 mole) di-t-butyl peroxide (DTBP) dissolved in about 30 grams of heptane. The grafting reaction is allowed to continue for 30 minutes beyond the 60 minutes allotted for the initiator feed. The purge gas is then redirected to flow under the polymer solution for 4 hours in order to strip the unreacted maleic anhydride and heptane. The DTBP promoted grafting of the maleic anhydride onto the polymer forming the corresponding succinic anhydride (SA) acylated graft product.

The next step is grafting of 1-vinylimidazole (VIMA) onto the acylated polymer prepared in the previous step. To carry out this segment of the preparation, two solutions are prepared, one containing about 2.50 grams (0.027 mole) of VIMA dissolved in about 30 gms of acetone and the other containing about 1.50 grams (0.010 mole) of DTBP dissolved in about 30 grams of heptane. Using syringe pumps, these solutions are delivered simultaneously to the reactor over a 60 minutes period. The grafting reaction is then allowed to proceed for an additional 30 minutes beyond the 60 minutes allotted for the initiator feed. After the VIMA reaction is essentially complete a charge of about 5.70 grams (0.031 mole) of N-phenyl-1,4-phenylenediamine is slowly added to the mixture and reacted with the acyl groups on the dual graft polymer formed in the previous steps over a period of 4 hours, thereby, generating the dual-monomer graft polymer product. Again, the purge gas is redirected to flow under the polymer solution in order to strip the volatiles such as the heptane and acetone.

At this time 4.0% by weight of titanium diisopropoxide bis(acetylacetovate) available from DuPont Chemical (Tyzor AA) is added to the polymer mixture over a 1 minute period and allowed to mix thoroughly. After the monomer is incorporated to the reaction mixture, 0.30% by weight of di-t-butyl peroxide (DTBP Aldrich Chemical #16, 8521-1) is added over a 60-minute period. Upon completion of the DTBP addition, the reaction is allowed to continue mixing with heating for 30 additional minutes. The resulting product contains the multiple function (viscosity index improver, dispersant, anti-wear) graft polymer of the present invention.

While the invention is described in connection with one or more preferred embodiments and certain illustrative examples, it will be understood that the invention is not limited to those embodiments and examples. The invention includes all alternatives, modifications and equivalents as may be included within the spirit and scope of the appended claims.

I claim:

1. A method of making a multifunctional graft polymer comprising:
    (a) reacting a polymer comprising a backbone, the polymer having graftable sites and a weight average molecular weight in the range of from about 10,000 to about 500,000, and a coupling agent selected from the group consisting of acylating agents and epoxides and having at least two component coupling sites, at least one of which is a site of olefinic unsaturation, in the presence of an initiator to form a graft reaction product having coupling groups on the backbone of the polymer available for reaction;
    (b) reacting the graft reaction product formed in step (a) with an ethylenically unsaturated monomer having from 2 to about 50 carbon atoms and containing at least one of nitrogen and oxygen in the presence of an initiator to form a graft reaction product of the ethylenically unsaturated monomer and the polymer;
    (c) reacting the graft product formed in step (b) with an amine capable of reacting with the coupling groups on the backbone of the polymer to form a reaction product of the amine and coupling groups on the polymer backbone; and
    (d) reacting an organo-metallic compound with the product of step (c) to form the multifunctional graft polymer.

2. A method of making a multifunctional graft polymer comprising:
    (a) reacting in solution a polymer comprising a backbone, the polymer having graftable sites and a weight average molecular weight in the range of from about 10,000 to about 500,000, and a coupling agent selected from the group consisting of acylating agents and epoxides and having at least two component coupling sites, at least one of which is a site of olefinic unsaturation, in the presence of an initiator to form a graft reaction product having coupling groups available for reaction;
    (b) reacting in solution the graft reaction product formed in step (a) with an ethylenically unsaturated monomer having from 2 to about 50 carbon atoms and containing at least one of nitrogen and oxygen in the presence of an initiator to form a graft reaction product of the ethylenically unsaturated monomer and polymer;
    (c) reacting in solution the graft reaction product formed in step (b) with an amine capable of reacting with the coupling groups on the backbone of the polymer to form a reaction product of the amine and coupling groups on the polymer backbone; and
    (d) reacting in solution an organo-metallic compound with the product of step (c) to form the multifunctional graft polymer.

3. The method of claim 2 wherein the reaction takes place in a solvent selected from Group I, Group II, Group III, Group IV, Group V base stocks and mixtures thereof.

4. A method of making a multifunctional graft polymer comprising the steps of;
    (a) reacting as a melt a polymer comprising a backbone, the polymer having graftable sites and a weight average molecular weight in the range of from about 10,000 to about 500,000 and a coupling agent selected from the group consisting of acylating agents and epoxides and having at least two component coupling sites, at least one of which is a site of olefinic unsaturation, either thermally or in the presence of an initiator to form a graft reaction product having coupling groups on the polymer backbone available for reaction;
    (b) reacting as a melt the graft reaction product formed in step (a) with an ethylenically unsaturated monomer having from 2 to about 50 carbon atoms and containing at least one of nitrogen and oxygen either thermally or in the presence of an initiator to form a graft reaction product of the ethylenically unsaturated monomer and polymer;
    (c) reacting as a melt or in solution the graft reaction product formed in step (b) with an amine capable of reacting with the coupling groups on the backbone of the polymer to form a reaction product of the amine and coupling groups on the polymer backbone; and
    (d) reacting as a melt or in solution an organo-metallic compound with the product of step (c) to form the multifunctional graft polymer.

5. The method of claim 4 wherein in step (a) the polymer is first melted and then is mixed with the coupling agent and the initiator.

6. The method of claim 1, wherein the polymer is selected from the group consisting of polyolefins, polyesters, mixed olefin-ester polymers and mixtures thereof.

7. The method of claim 6, which comprises at least one polymer produced from ethylene, propylene, isoprene, butane, butadiene, isobutylene, styrene, an alkyl methacryate, an alkyl acrylate, or combinations thereof.

8. The method of claim 1, wherein the polymer has a weight average molecular weight of from about 150,000 to about 200,000.

9. The method of claim 1, wherein the ethylenically unsaturated monomer is selected from the group consisting of 1-vinylimidazole, 1-vinyl-2-pyrrolidinone, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, and combinations thereof.

10. The method of claim 1, wherein the coupling agent comprises an acylating agent selected from the group consisting of monocarboxylic acids, dicarboxylic acids, polycarboxylic acids, anhydrides of such carboxylic acids, lower alkyl esters of such carboxylic acids, halides of such carboxylic acids, and combinations thereof.

11. The method of claim 10, wherein the coupling agent comprises an acylating agent selected from the group consisting of monounsaturated $C_3$ to $C_{10}$ monocarboxylic acids, monounsaturated $C_4$ to $C_{10}$ dicarboxylic acids, the anhydrides thereof and mixtures of two or more of such acylating agents.

12. The method of claim 1, wherein the amine is selected from the group consisting of primary amines and secondary amines.

13. The method of claim 12, wherein the amine is selected from the group consisting of methyleneamines, ethyleneamnines, butyleneamines, propyleneamines, pentyleneamines, hexyleneamines, heptyleneamines, octyleneamines, amino-alkyl-substituted piperazines, ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, 3-mophoolinopropylamine, aniline, 4-morpholine aniline, benzylamine, phenylethylamine, 3-phenyl-1-propylamine, N-phenylphenylenediamines, N-phenyl-1,4-phenylendediamine, N-phenyl1,3-phenylenediamine, N-phenyl1,2-phenyienediamine, N-naphthyl-phenylenediamine, N-phenyinaphthaienediamine, N'-aminopropyl-N-phenylphenylenediamine, N,N-dimethylaminopropyl amine, N,N-dioctylenthyl amine, (2-aminopropyl)piperazine, 1-4-bis(2-aminoehtyl)piperazines, 2-methyl-1-(2-aminobutyl)piperazine, N-arylphenylenediamines represented by the formula:

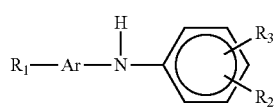

in which Ar is aromatic and $R_1$ is hydrogen, —NH-aryl, —-NH-arylalkyl, —NH-alkylaryl, or a branched or straight chain radical having from 4 to 24 carbon atoms and the radical can be an alkyl, alkenyl, alkoxyl, arylalkyl, alkylaryl, hydroxyalkyl or aminoalkyl radical, $R_2$ is —$NH_2$, —$(NH(CH_2)_n—)_m$—$NH_2$, —$CH_2$—$(CH_2)_n$—$NH_2$, -aryl-$NH_2$, in which n and m each has a value from 1 to 10, and $R_3$ is hydrogen or an alkyl, alkenyl, alkoxyl, arylalkyl, or alkylaryl radical, which may have from 4 to 24 carbon atoms; or by the formula:

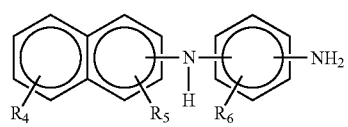

in which $R_4$, $R_5$ and $R_6$ are hydrogen or a linear or branched hydrocarbon radical containing from 1 to 10 carbon atoms and that radical may be an alkyl, alkenyl, alkoxyl, alkylaryl, arylalkyl, hydroxyalkyl, or aminoalkyl radical, and $R_4$, $R_5$ and $R_6$ can be the same or different; aminocarbazoles represented by the formula:

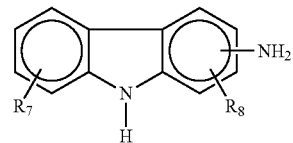

in which $R_7$ and $R_8$ represent hydrogen or an alkyl, alkenyl, or alkoxyl radical having from 1 to 14 carbon atoms, and $R_7$ and $R_8$ can be the same or different; aminoindoles represented by the formula:

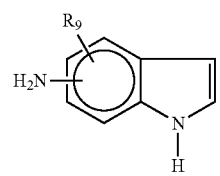

in which $R_9$ represents hydrogen or an alkyl radical having from 1 to 14 carbon atoms; amino-indazolinones represented by the formula:

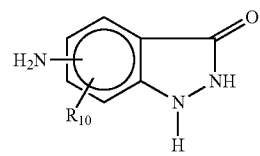

in which $R_{10}$ is hydrogen or an alkyl radical having from 1 to 14 carbon atoms; aminomercaptotriazole represented by the formula:

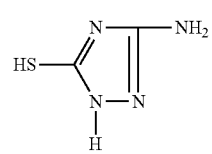

and aminoperimidines represented by the formula:

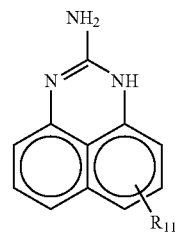

in which $R_{11}$ represents hydrogen or an alkyl or alkoxyl radical having from 1 to 14 carbon atoms; and combinations thereof.

14. The method of claim 1, wherein the organo-metallic compound comprises a metallic member selected from the group consisting of molybdenum, cobalt, titanium, calcium, magnesium, manganese, bismuth, tungsten, and copper.

15. The method of claim 14, wherein the organo-metallic compound comprises a metal carboxylate containing a metallic component selected from the group consisting of molybdenum, cobalt, titanium, calcium, magnesium, manganese, bismuth, tungsten, and copper.

16. The method of claim 14, wherein the organo-metallic compound comprises a molybdenum compound.

17. The method of claim 15, wherein the organo-metallic compound comprises a metal carboxylate comprising a molybdenum carboxylate.

18. The method of claim 17, wherein the molybdenum carboxylate comprises at least one linear or branched carboxylate moiety having $C_6$ to $C_{40}$ carbon atoms.

19. The method of claim 16, wherein the molybdenum compound is selected from the group consisting of: molybdenum boro neodecanoate, molybdenum 2-ethylhexanoate 4-nonyloxybenzoate, molybdenum (isosterate) (4-nonyloxybenzoate), molybdenum dodecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}/C_{36}$+ linear carboxylate, molybdenum $C_{36}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, molybdenum octoate, molybdenum acetylacetonate, and combinations thereof.

20. The method of claim 17, wherein the molybdenum compound comprises molybdenum acetylacetonates, molybdenum octoate, or molybdenum boro neodecanoate.

* * * * *